(12) United States Patent
Hwang et al.

(10) Patent No.: US 10,057,100 B2
(45) Date of Patent: Aug. 21, 2018

(54) METHOD AND APPARATUS FOR TRANSMITTING AND RECEIVING BROADCAST SIGNAL

(71) Applicant: LG ELECTRONICS INC., Seoul (KR)

(72) Inventors: Jaeho Hwang, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/128,838

(22) PCT Filed: Feb. 25, 2015

(86) PCT No.: PCT/KR2015/001796
§ 371 (c)(1),
(2) Date: Sep. 23, 2016

(87) PCT Pub. No.: WO2015/160083
PCT Pub. Date: Oct. 22, 2015

(65) Prior Publication Data
US 2018/0019903 A1 Jan. 18, 2018

Related U.S. Application Data

(60) Provisional application No. 61/978,969, filed on Apr. 13, 2014, provisional application No. 61/984,844, filed on Apr. 27, 2014.

(51) Int. Cl.
*H04L 27/28* (2006.01)
*H04L 27/26* (2006.01)
(Continued)

(52) U.S. Cl.
CPC ...... *H04L 27/2627* (2013.01); *H04L 27/2615* (2013.01); *H04L 27/2649* (2013.01);
(Continued)

(58) Field of Classification Search
CPC ............... H04L 27/2647; H04L 5/0007; H04L 27/2657; H04L 65/4076; H04L 5/0053; H04H 20/18; H04H 20/28; H04H 20/40
(Continued)

(56) References Cited

U.S. PATENT DOCUMENTS

2012/0327955 A1  12/2012  Herrmann et al.
2013/0039278 A1   2/2013  Bouazizi et al.
(Continued)

FOREIGN PATENT DOCUMENTS

WO  WO 2010/142853 A1  12/2010
WO  WO 2012/070859 A2  12/2010

*Primary Examiner* — Khai Tran
(74) *Attorney, Agent, or Firm* — Birch, Stewart, Kolasch & Birch, LLP

(57) ABSTRACT

An apparatus for transmitting a broadcast signal is introduced. The apparatus for transmitting a broadcast signal according to the present invention includes: an input formatting module configured to de-multiplex an input stream into at least one Data Pipe (DP); a BICM module configured to perform error correction processing on data of the at least one DP; a frame building module configured to generate a signal frame including the data of the DP; an OFDM generation module configured to generate a transmission broadcast signal by inserting a preamble into the signal frame and performing OFDM modulation; and a signaling generation module configured to generate Physical Layer Signaling (PLS) information.

10 Claims, 43 Drawing Sheets

(51) Int. Cl.
 H04L 29/06 (2006.01)
 *H04L 29/08* (2006.01)
(52) U.S. Cl.
 CPC .............. *H04L 69/04* (2013.01); *H04L 69/22* (2013.01); *H04L 69/323* (2013.01); *H04L 69/324* (2013.01)
(58) Field of Classification Search
 USPC ........ 375/260, 135, 267, 338; 370/389, 401; 455/412.1, 414
 See application file for complete search history.

(56) References Cited

U.S. PATENT DOCUMENTS

| | | | |
|---|---|---|---|
| 2013/0279380 A1* | 10/2013 | Hong | H04H 20/72 370/310 |
| 2014/0064280 A1 | 3/2014 | Qin et al. | |
| 2015/0365917 A1 | 12/2015 | Hong et al. | |
| 2016/0234355 A1* | 8/2016 | Lee | H04L 65/4076 |
| 2017/0180077 A1* | 6/2017 | Kwak | H04L 1/0042 |
| 2017/0272691 A1* | 9/2017 | Song | H04N 7/08 |

* cited by examiner

[Figure 1]
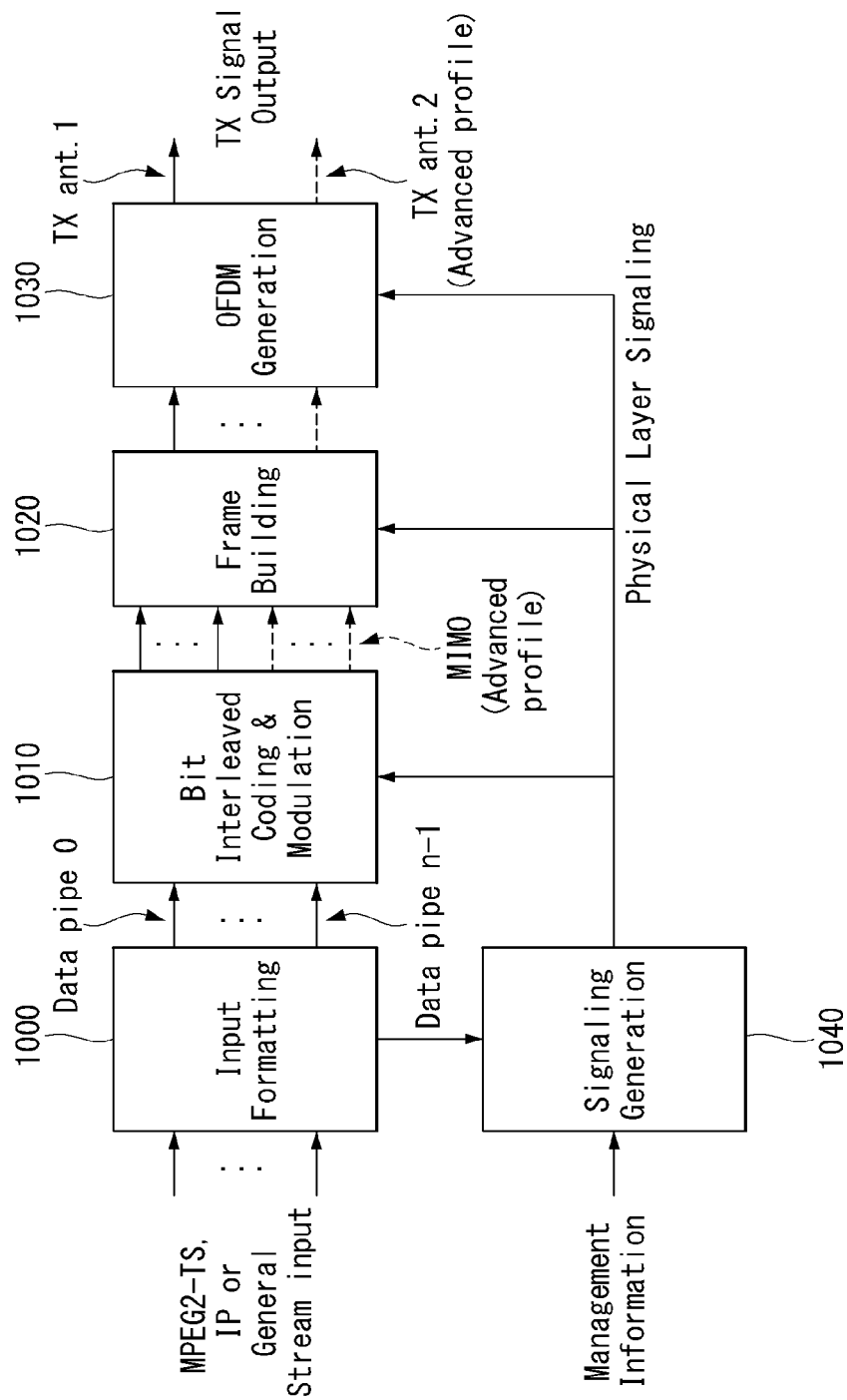

[Figure 2]
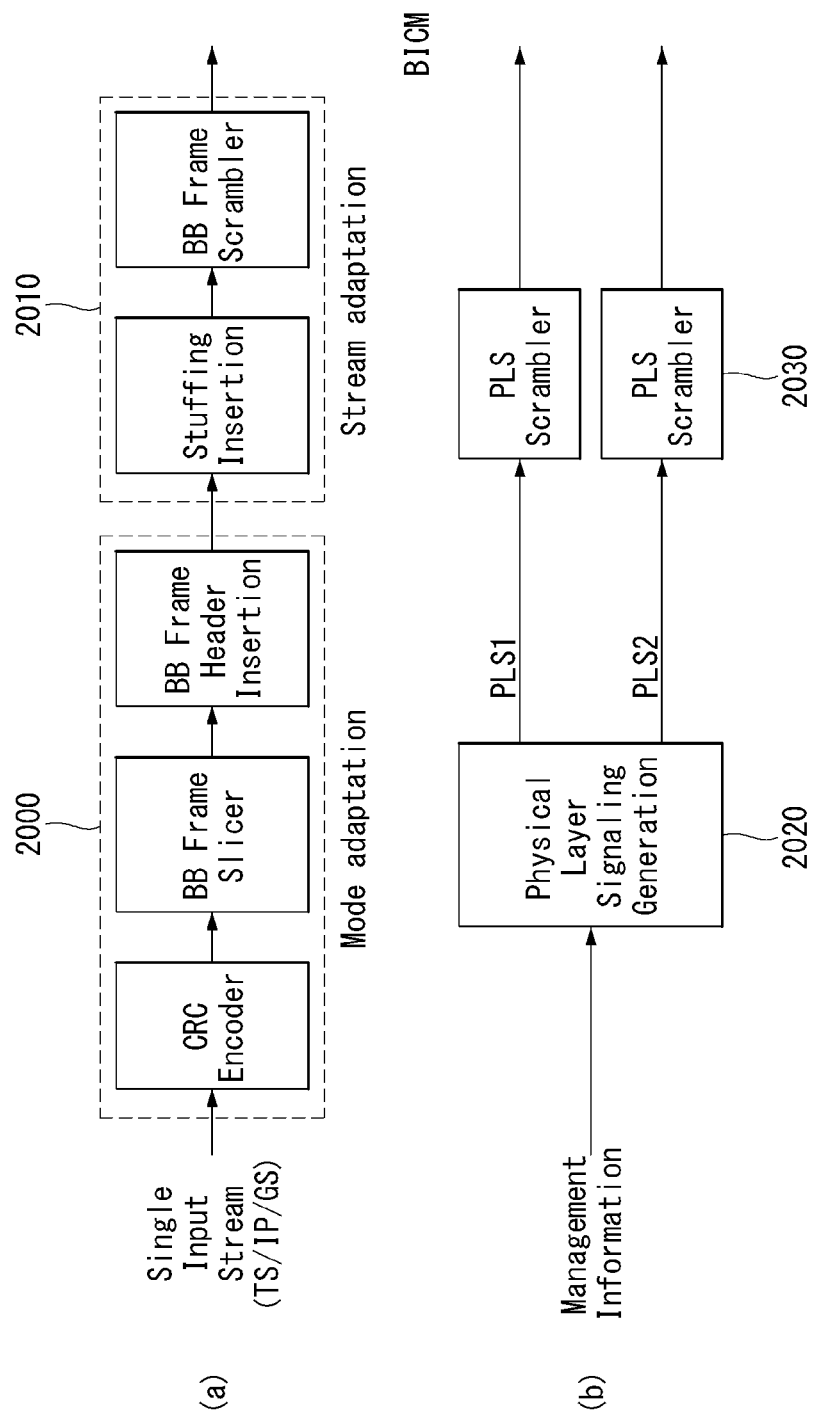

[Figure 3]
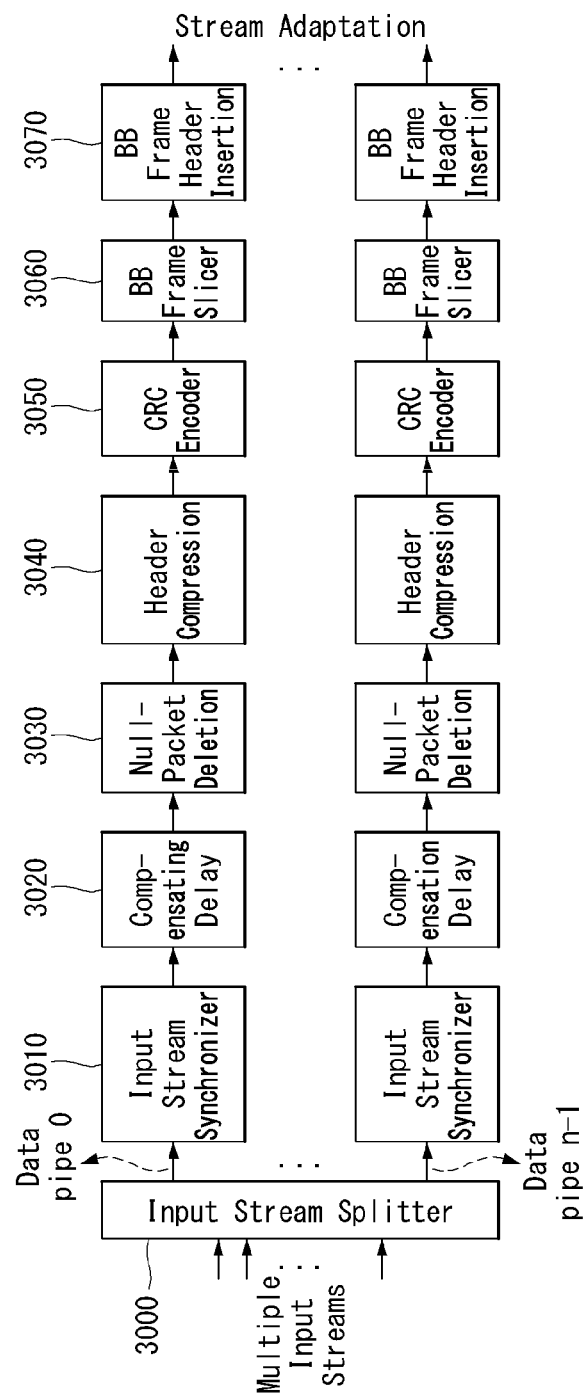

[Figure 4]
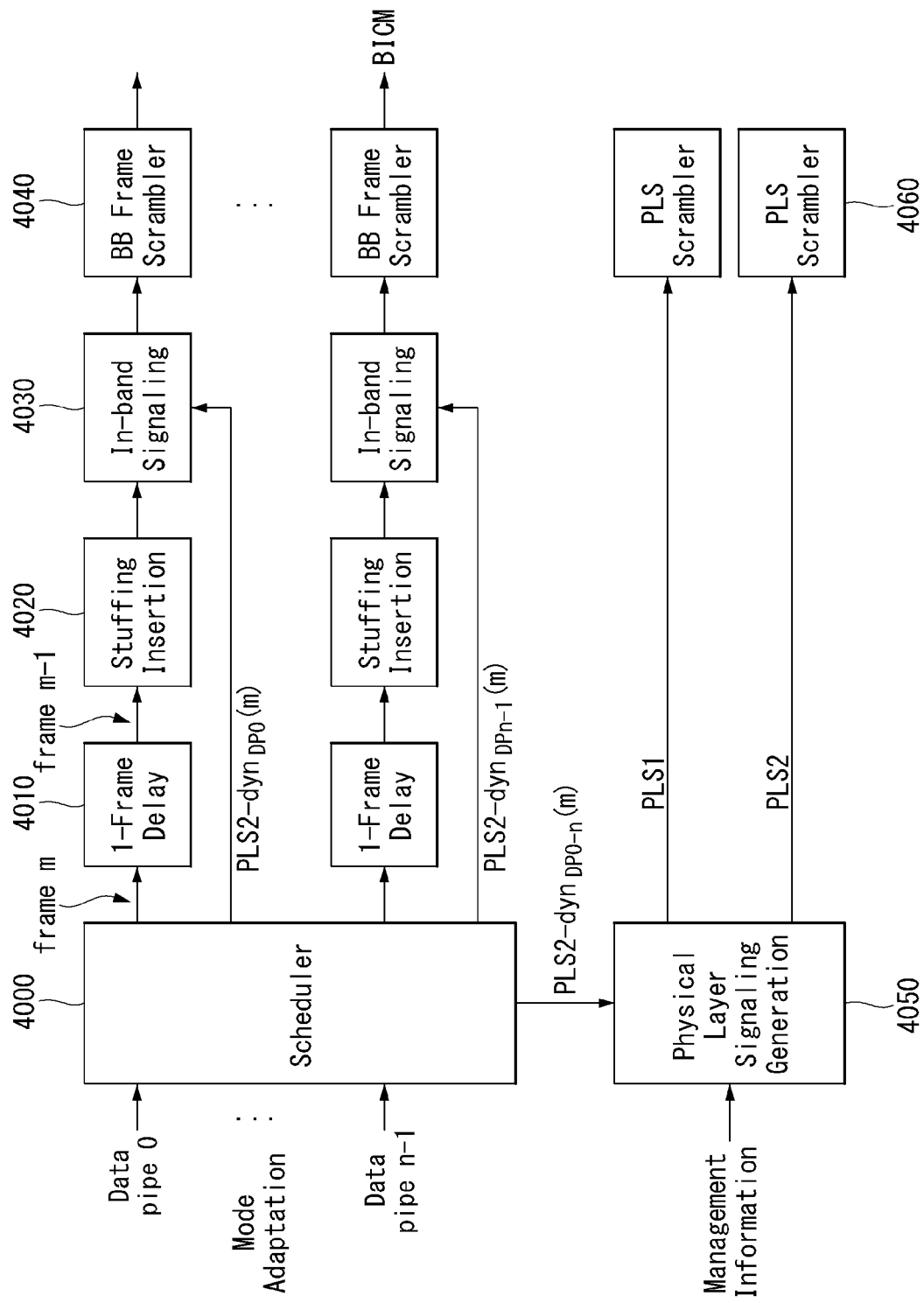

[Figure 5]
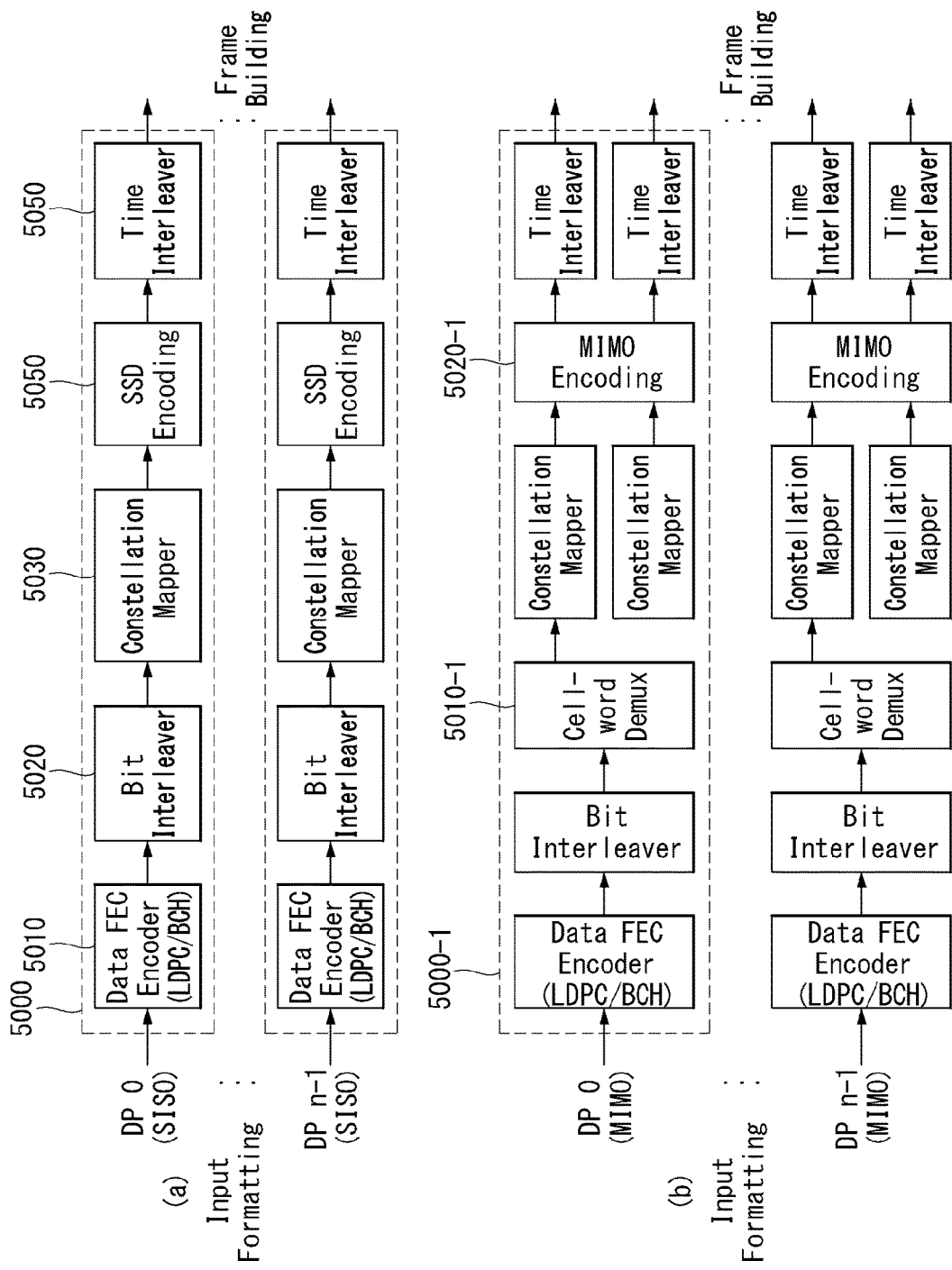

[Figure 6]
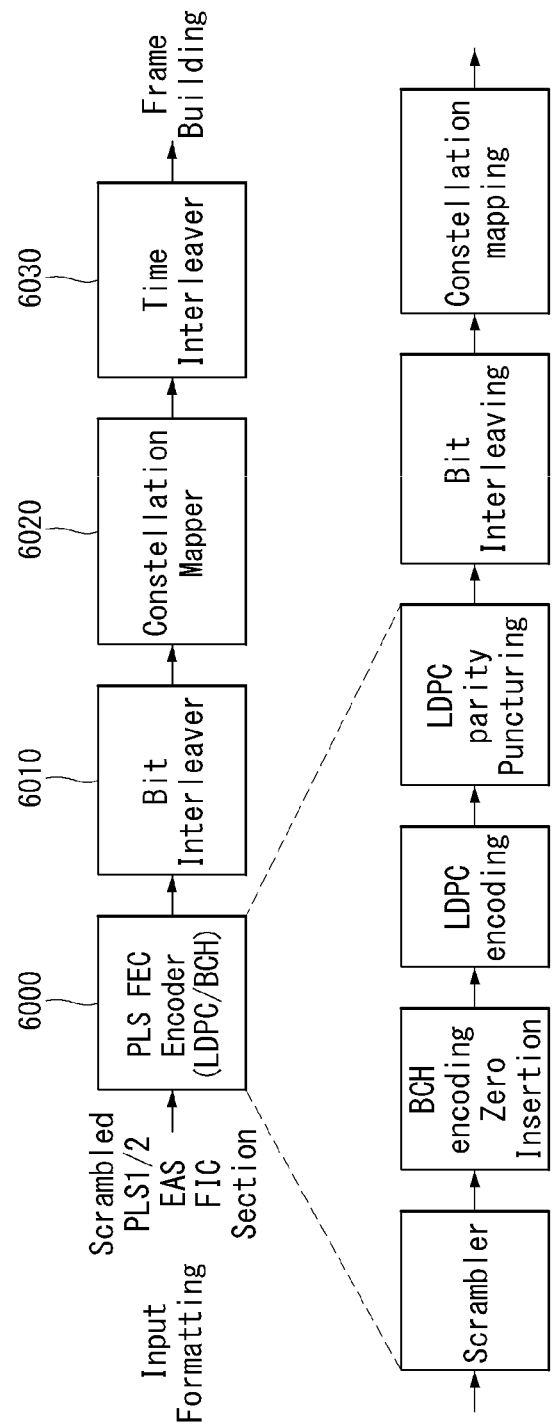

[Figure 7]
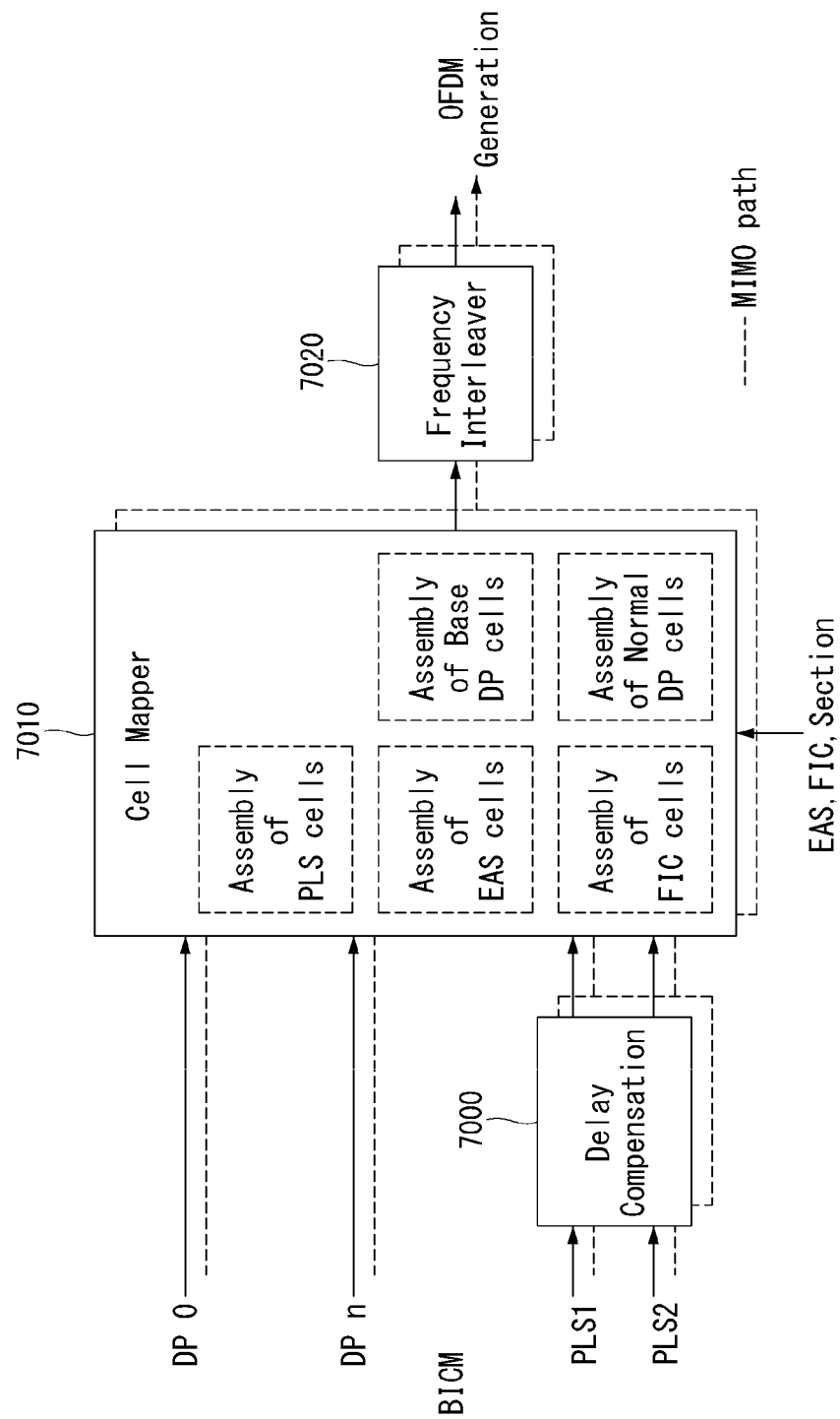

[Figure 8]
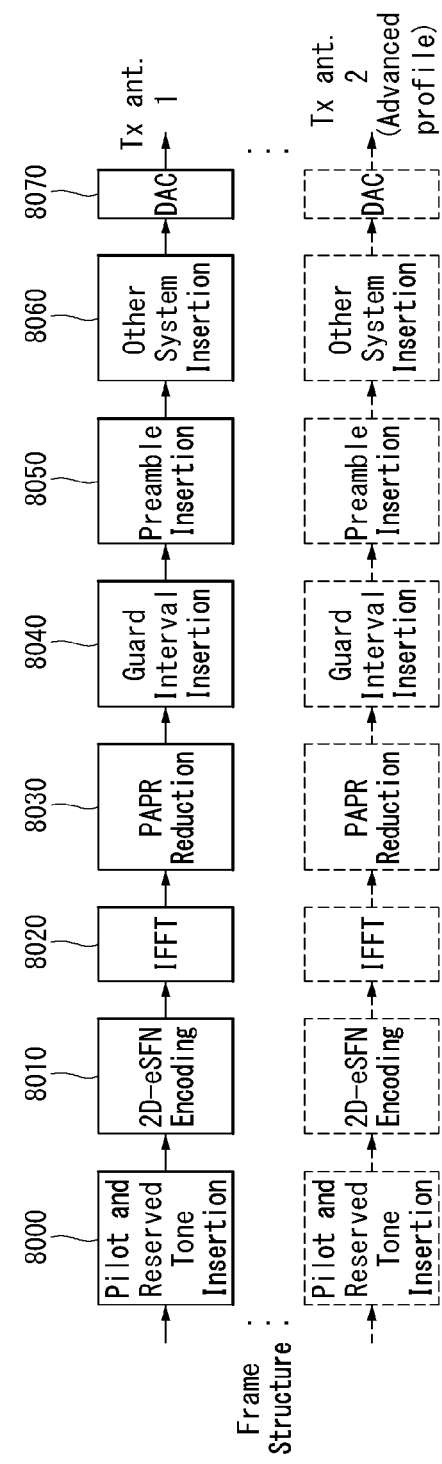

[Figure 9]
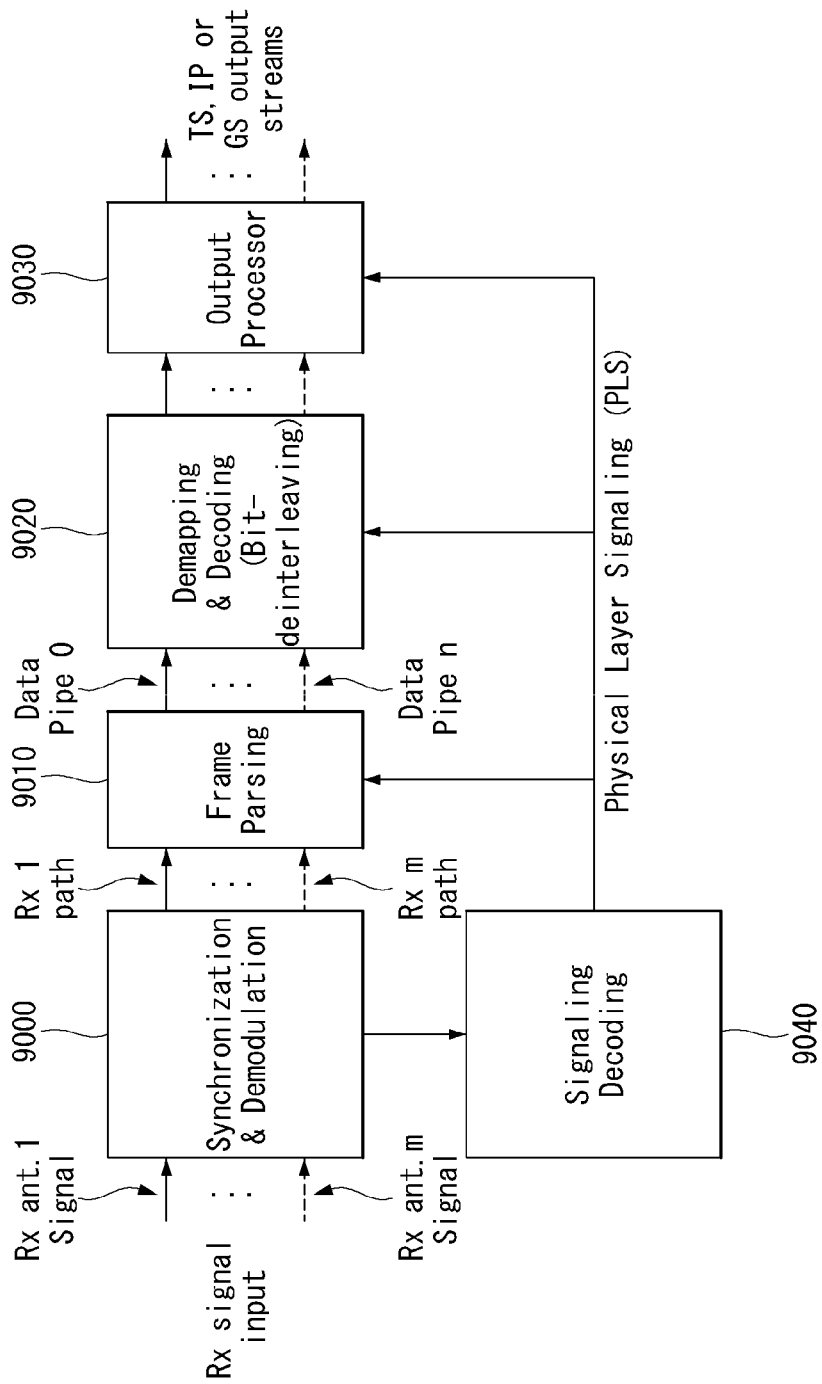

[Figure 10]
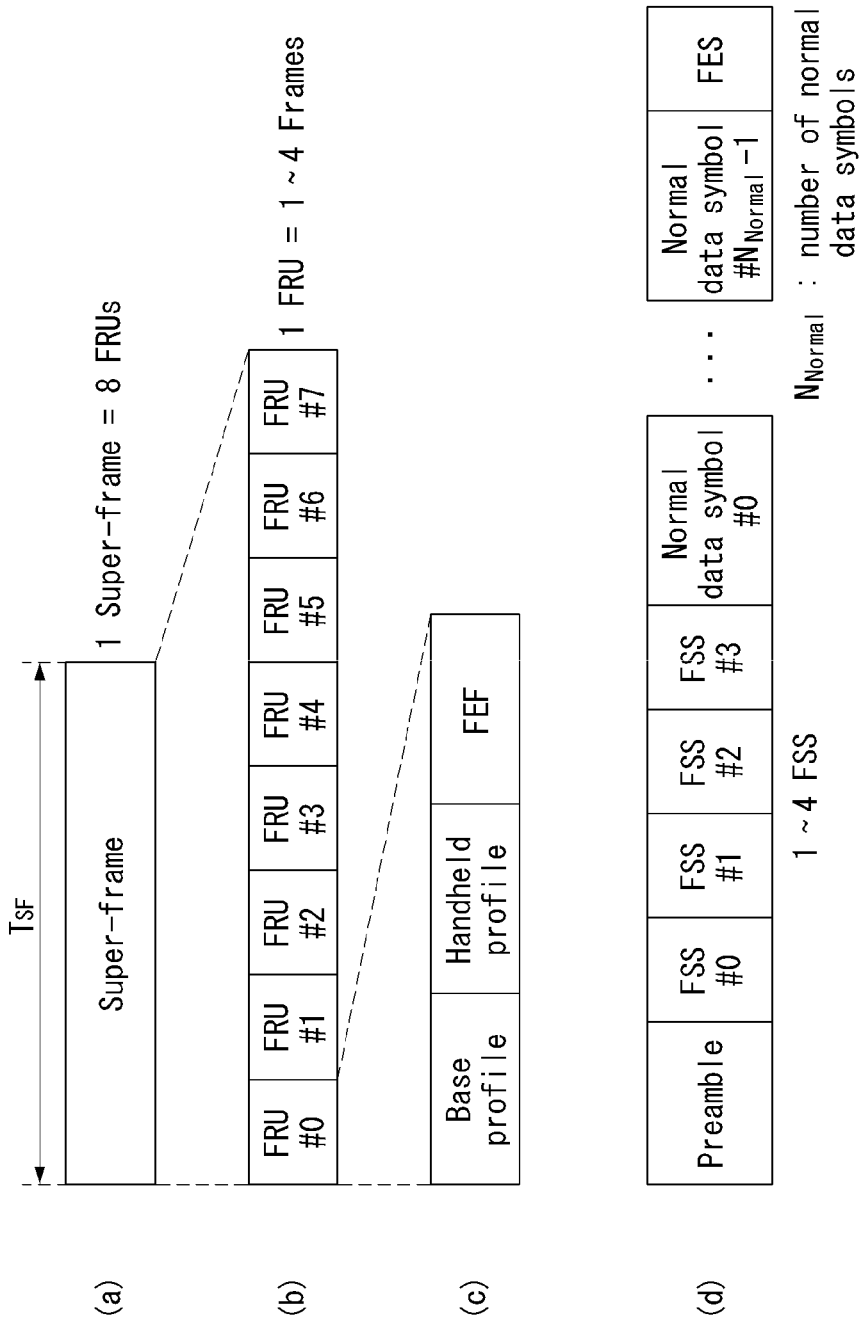

[Figure 11]
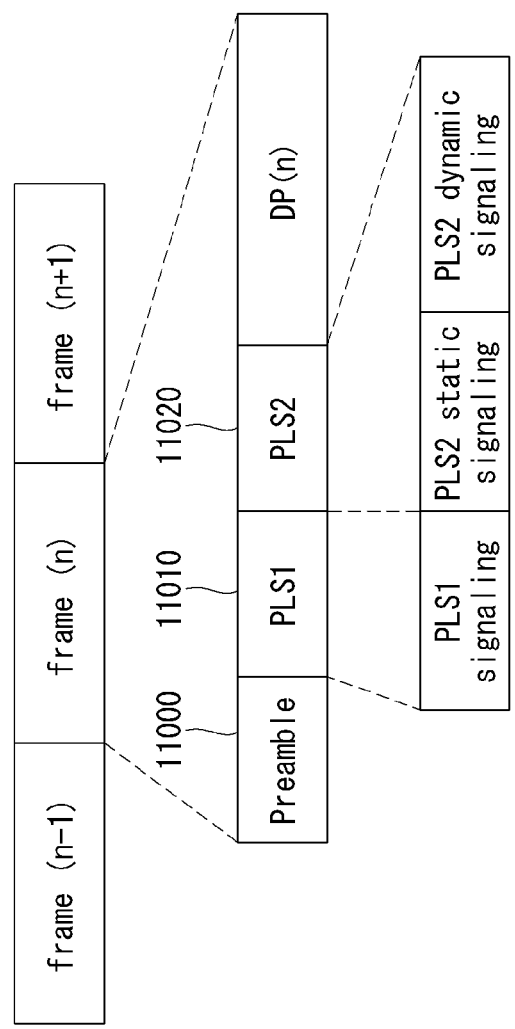

[Figure 12]

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Figure 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|   FRU_PHY_PROFILE | 3 |
|   FRU_FRAME_LENGTH | 2 |
|   FRU_GI_FRACTION | 3 |
|   RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Figure 14]

| Content | Bit |
|---|---|
| FIC_FLAG | 1 |
| AUX_FLAG | 1 |
| NUM_DP | 6 |
| for i = NUM_DP | |
|    DP_ID | 6 |
|    DP_TYPE | 3 |
|    DP_GROUP_ID | 8 |
|    BASE_DP_ID | 6 |
|    DP_FEC_TYPE | 2 |
|    DP_COD | 4 |
|    DP_MOD | 4 |
|    DP_SSD_FLAG | 1 |
|    if PHY_PROFILE = '010' | |
|      DP_MIMO | 3 |
|    end | |
|    DP_TI_TYPE | 1 |
|    DP_TI_LENGTH | 2 |
|    DP_TI_BYPASS | 1 |
|    DP_FRAME_INTERVAL | 2 |
|    DP_FIRST_FRAME_IDX | 5 |
|    DP_NUM_BLOCK_MAX | 10 |
|    DP_PAYLOAD_TYPE | 2 |
|    DP_INBAND_MODE | 2 |
|    DP_PROTOCOL_TYPE | 2 |
|    DP_CRC_MODE | 2 |
|    if DP_PAYLOAD_TYPE==TS('00') | |
|      DNP_MODE | 2 |
|      ISSY_MODE | 2 |
|      HC_MODE_TS | 2 |
|      if HC_MODE_TS=='01' or '10' | |
|        PID | 13 |
|      end | |
|    if DP_PAYLOAD_TYPE==IP('01') | |
|      HC_MODE_IP | 2 |
|    end | |
|    RESERVED | 8 |
| end | |
| if FIC_FLAG == 1 | |
|    FIC_VERSION | 8 |
|    FIC_LENGTH_BYTE | 13 |
|    RESERVED | 8 |
| end | |
| if AUX_FLAG == 1 | |
|    NUM_AUX | 4 |
|    AUX_CONFIG_RFU | 8 |
|    for i=1:NUM_AUX | |
|      AUX_STREAM_TYPE | 4 |
|      AUX_PRIVATE_CONF | 28 |
|    end | |
| end | |

[Figure 15]

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i = 1:NUM_AUX | |
|     AUX_PRIVATE_DYN | 48 |
| end | |
| CRC 32 | 32 |

[Figure 16]
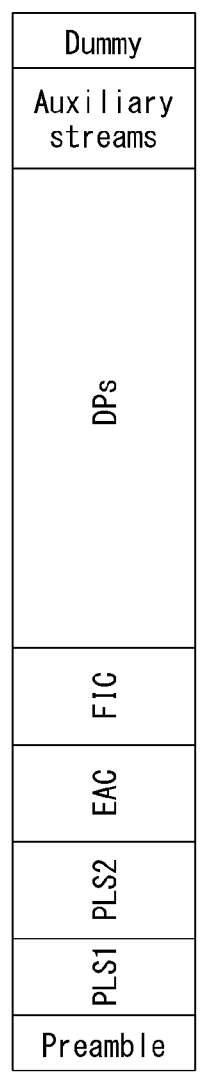

[Figure 17]
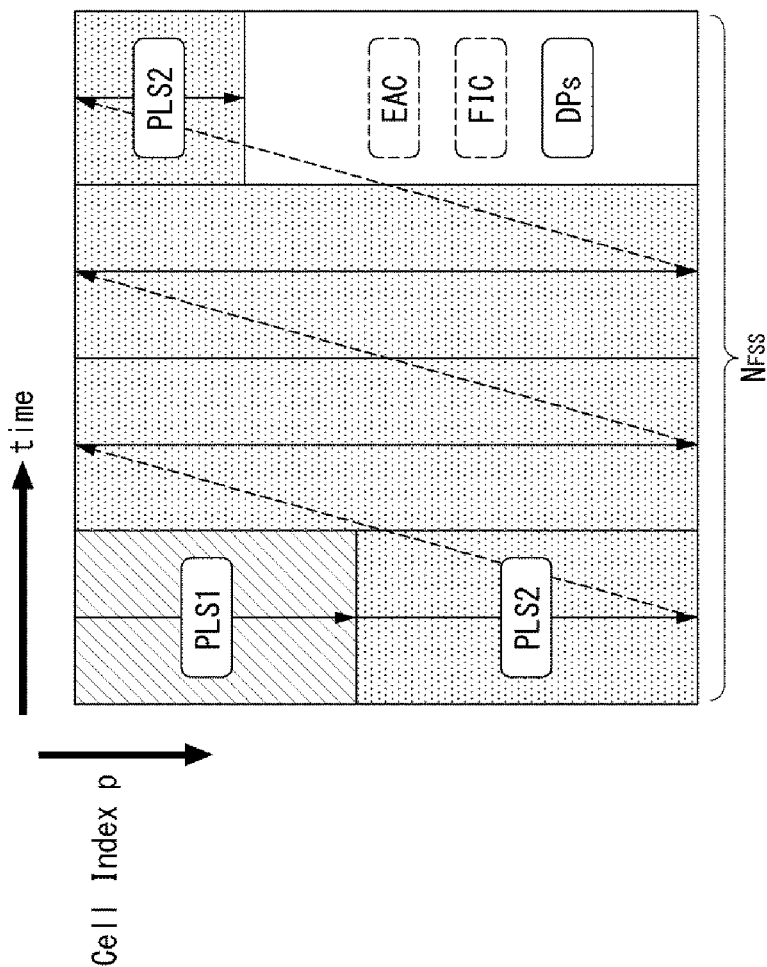

[Figure 18]
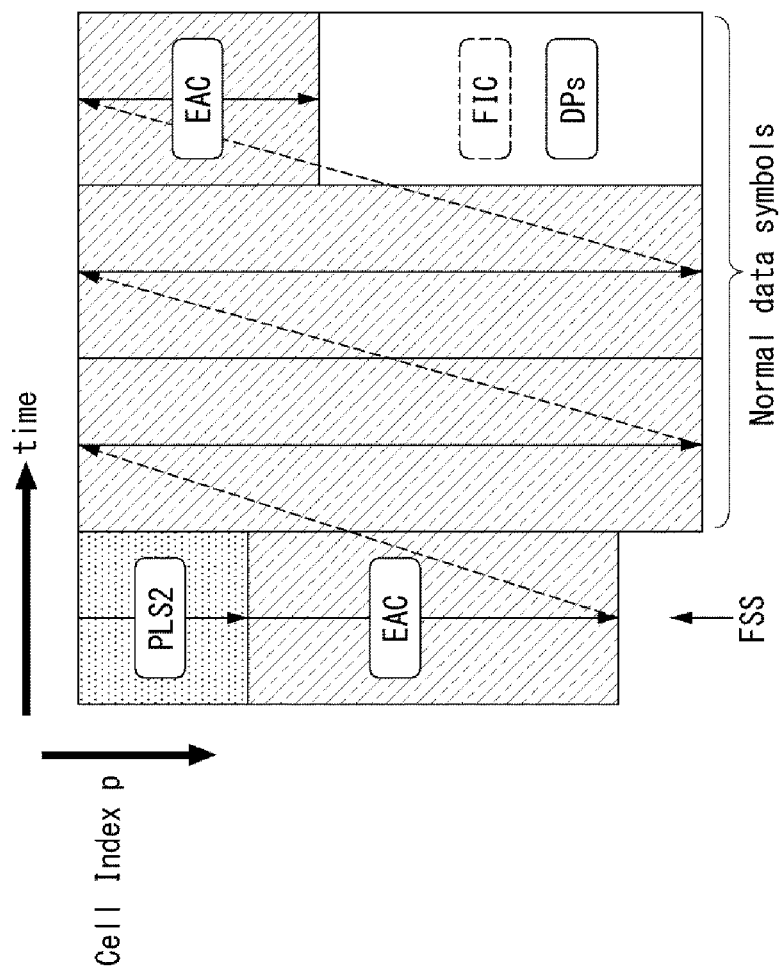

[Figure 19]
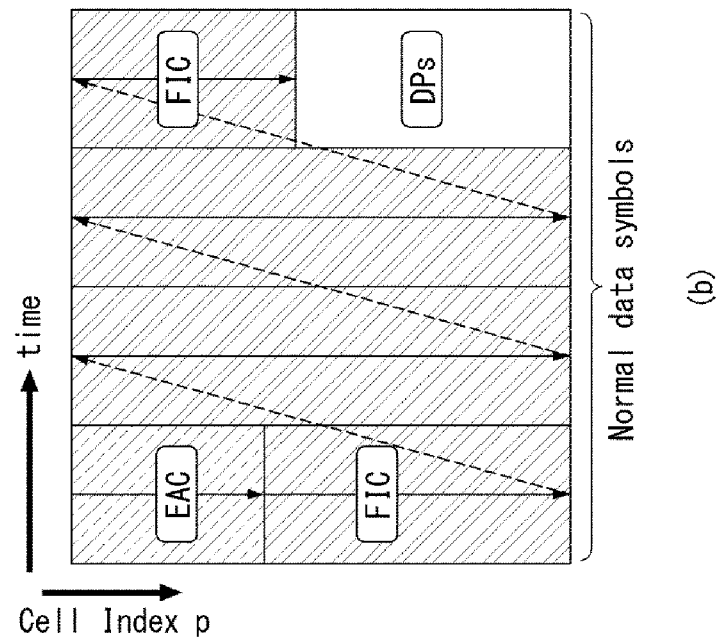
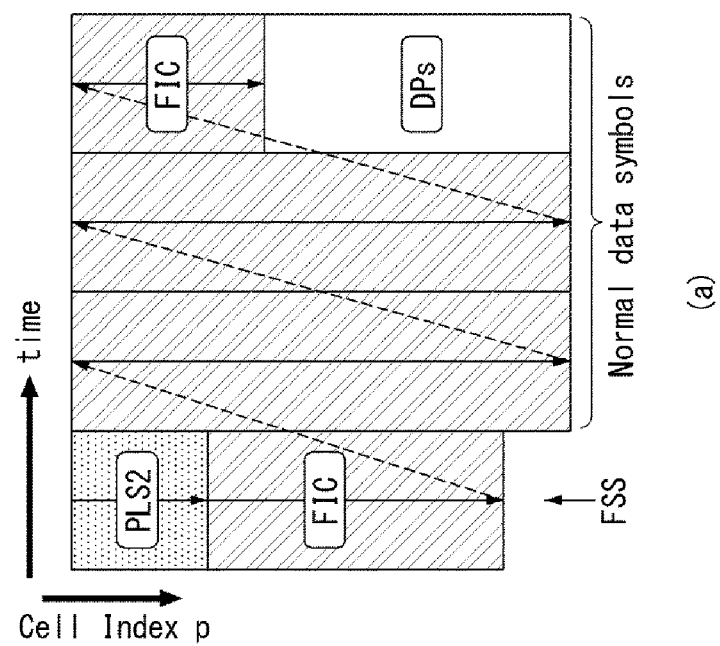

[Figure 20]
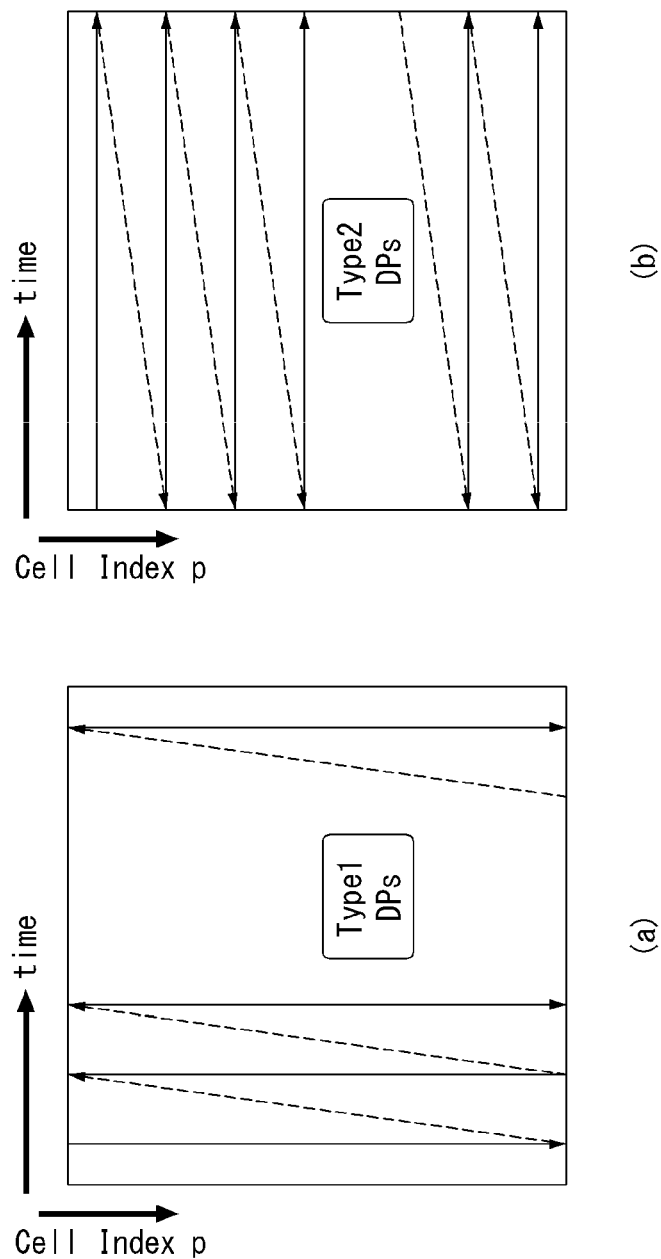

[Figure 21]
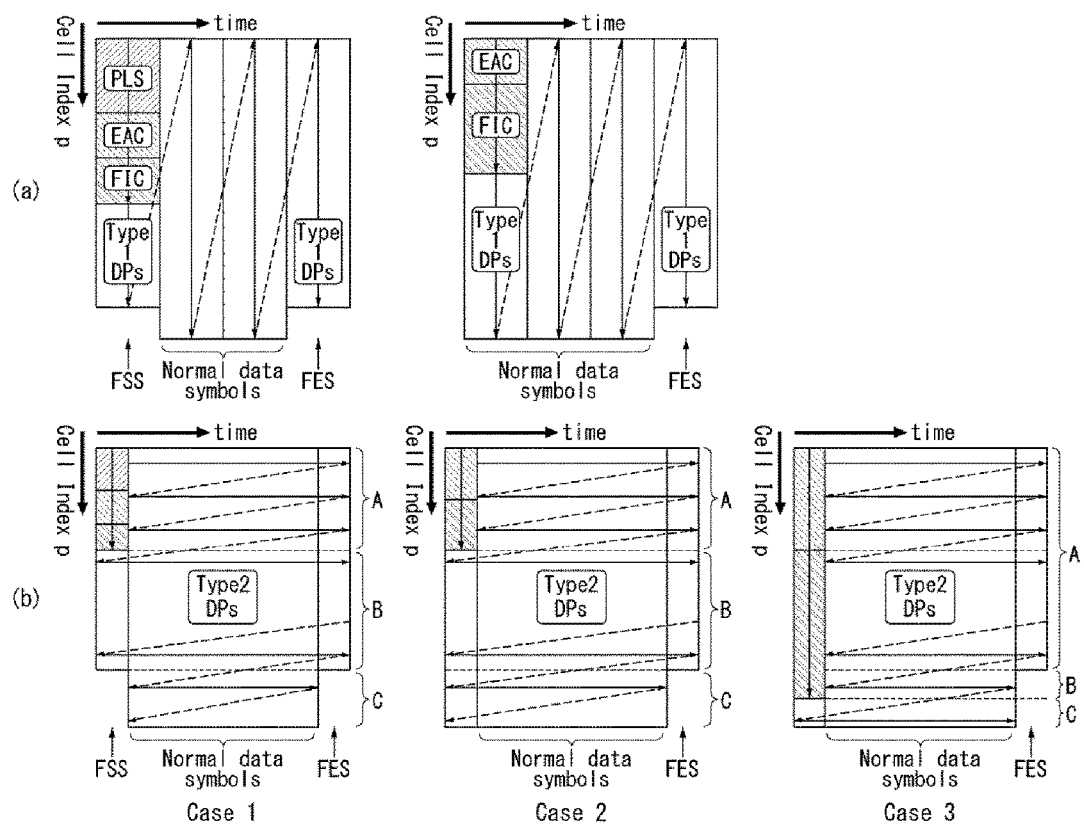

[Figure 22]
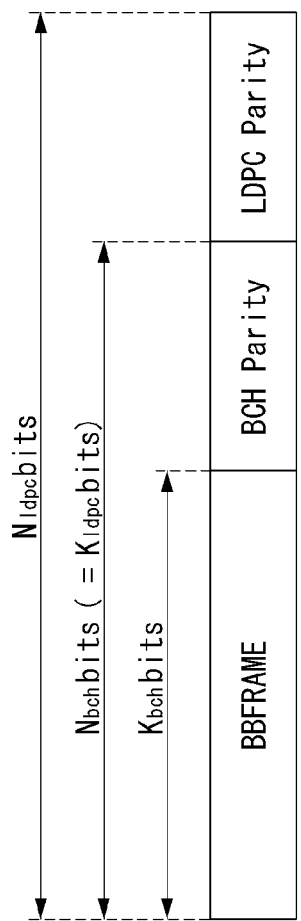

[Figure 23]
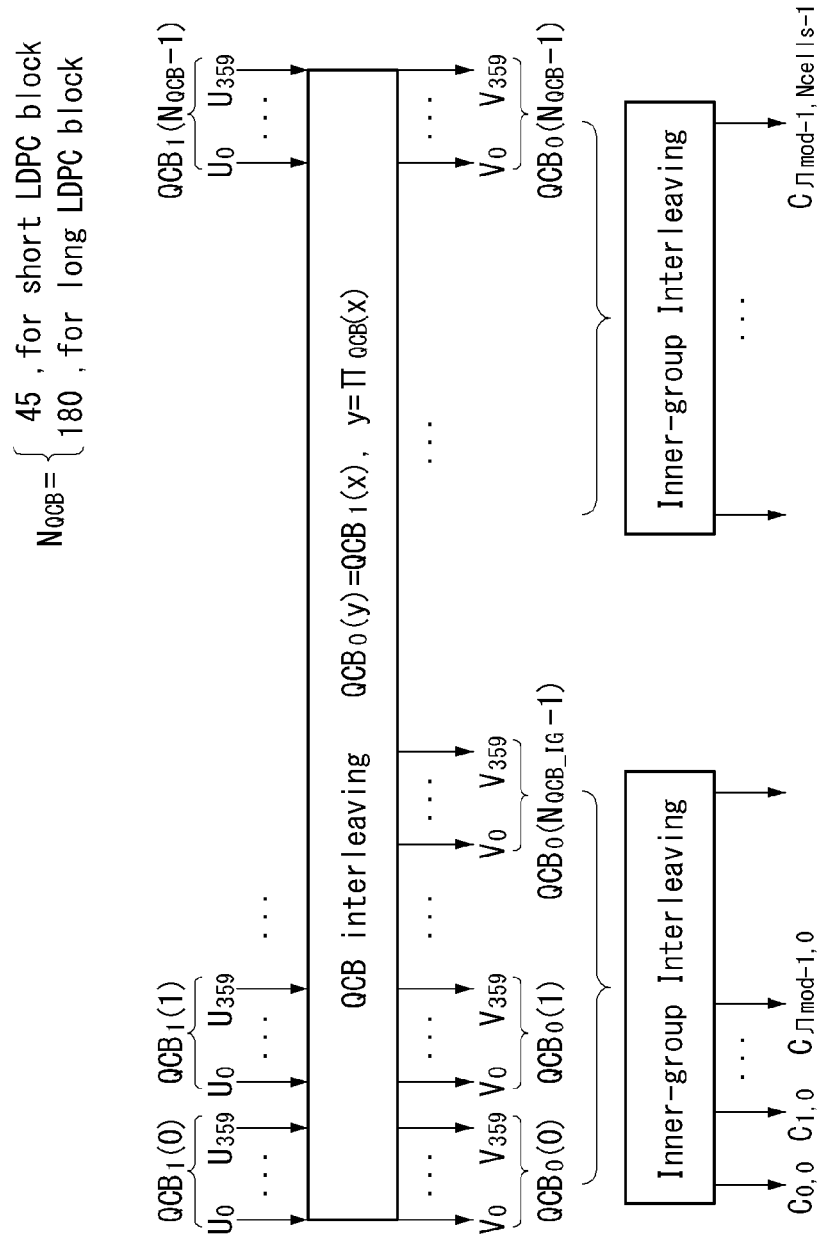

[Figure 24]
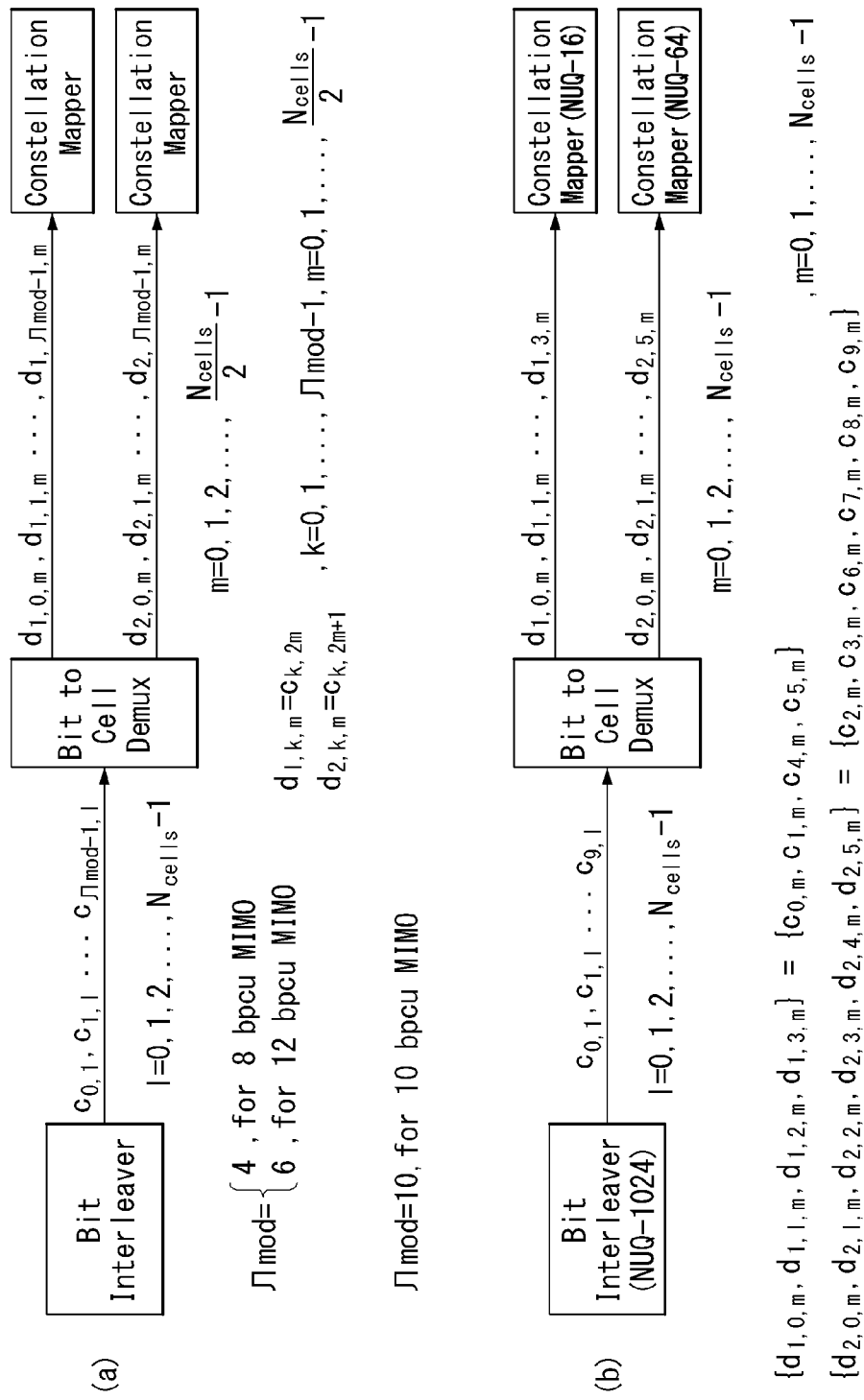

[Figure 25]
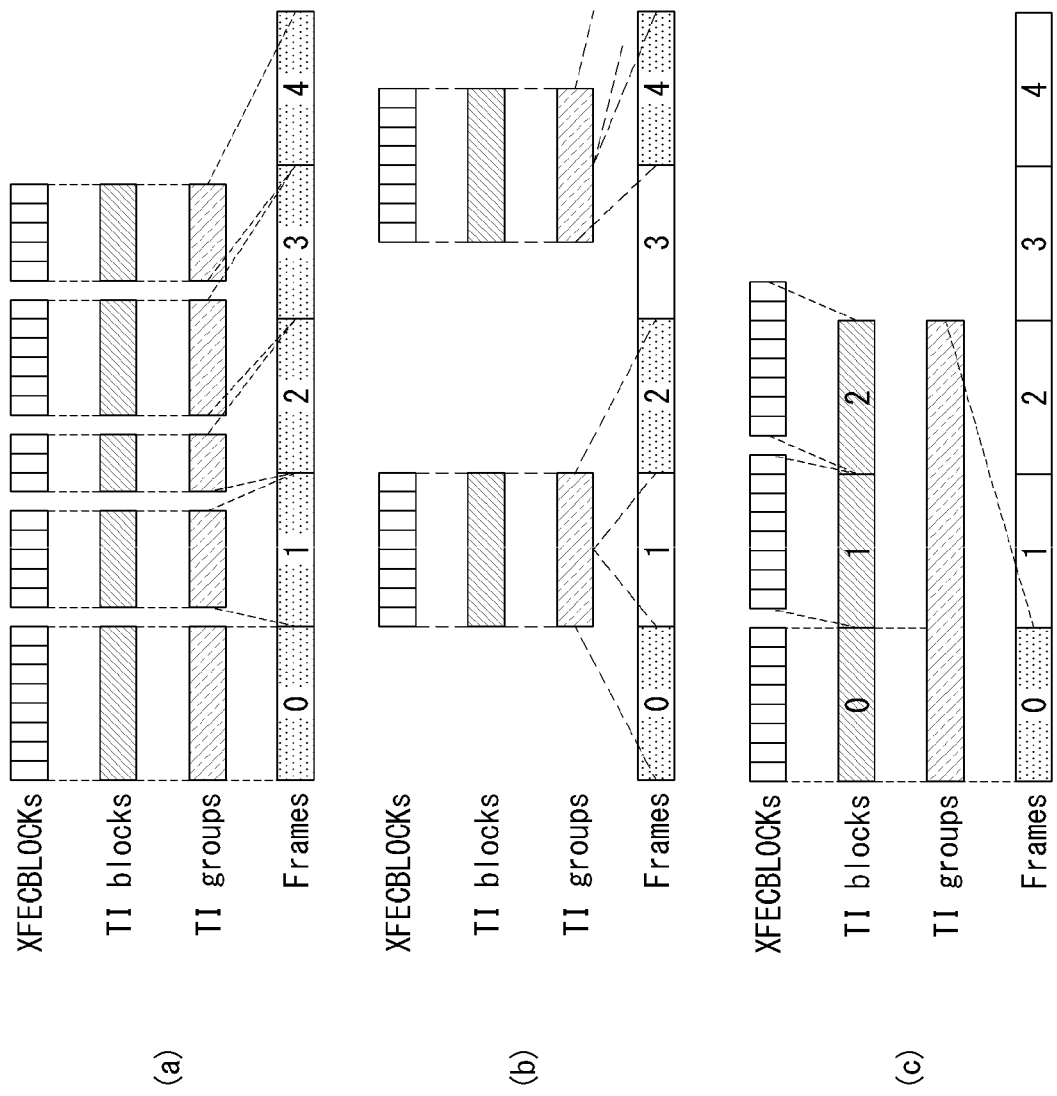

[Figure 26]
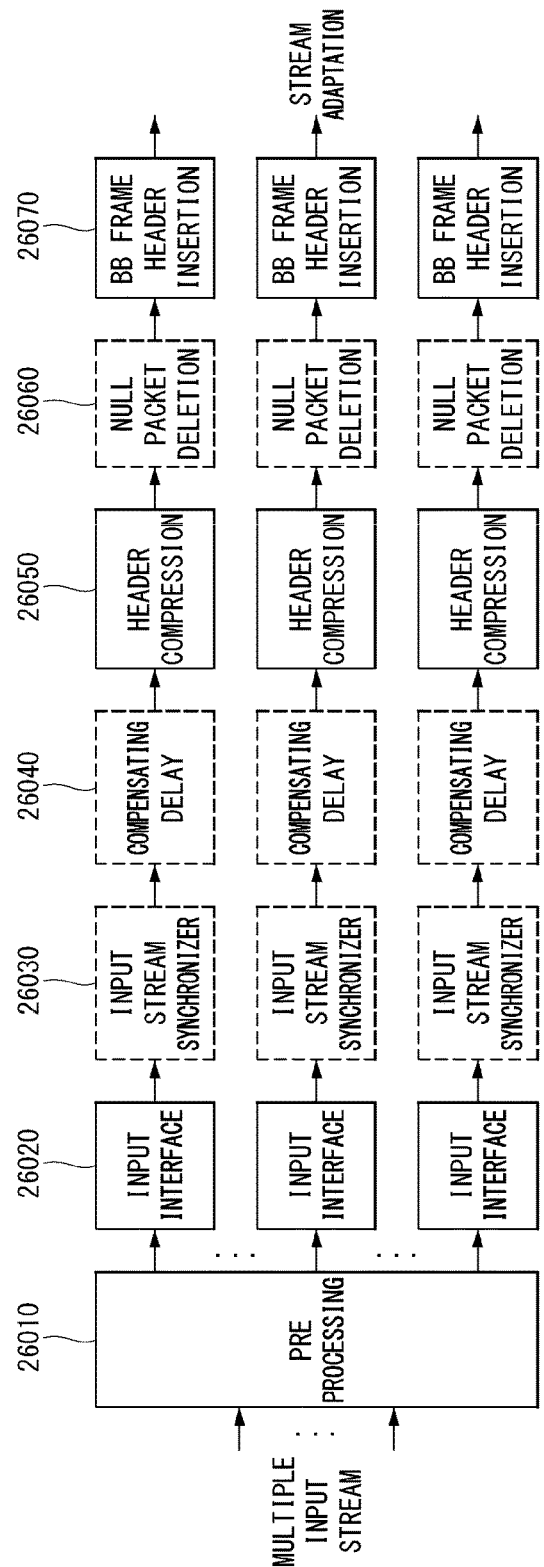

[Figure 27]
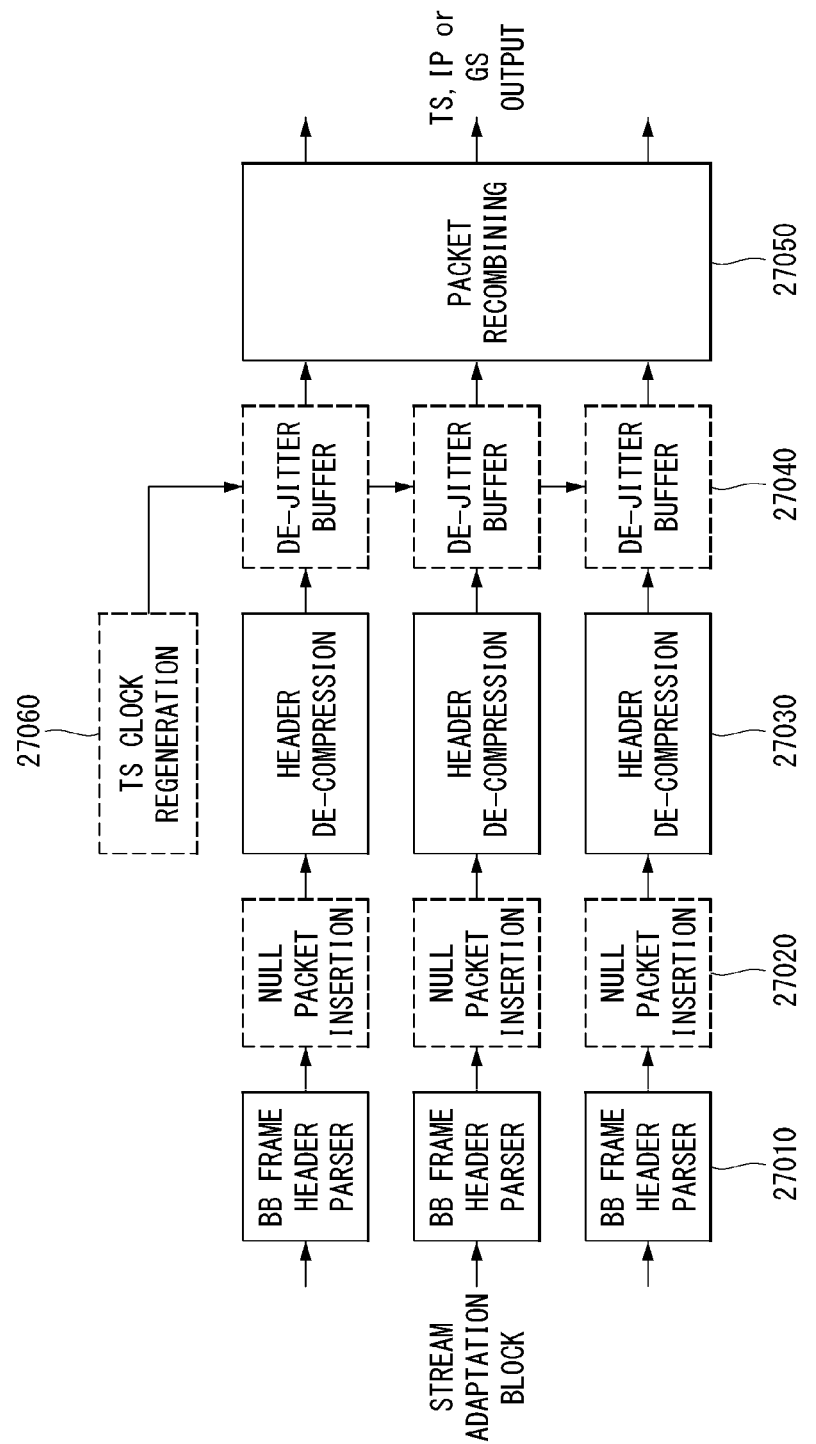

[Figure 28]
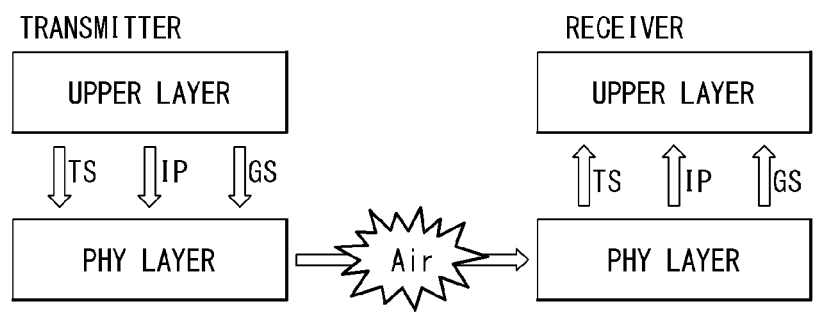

[Figure 29]
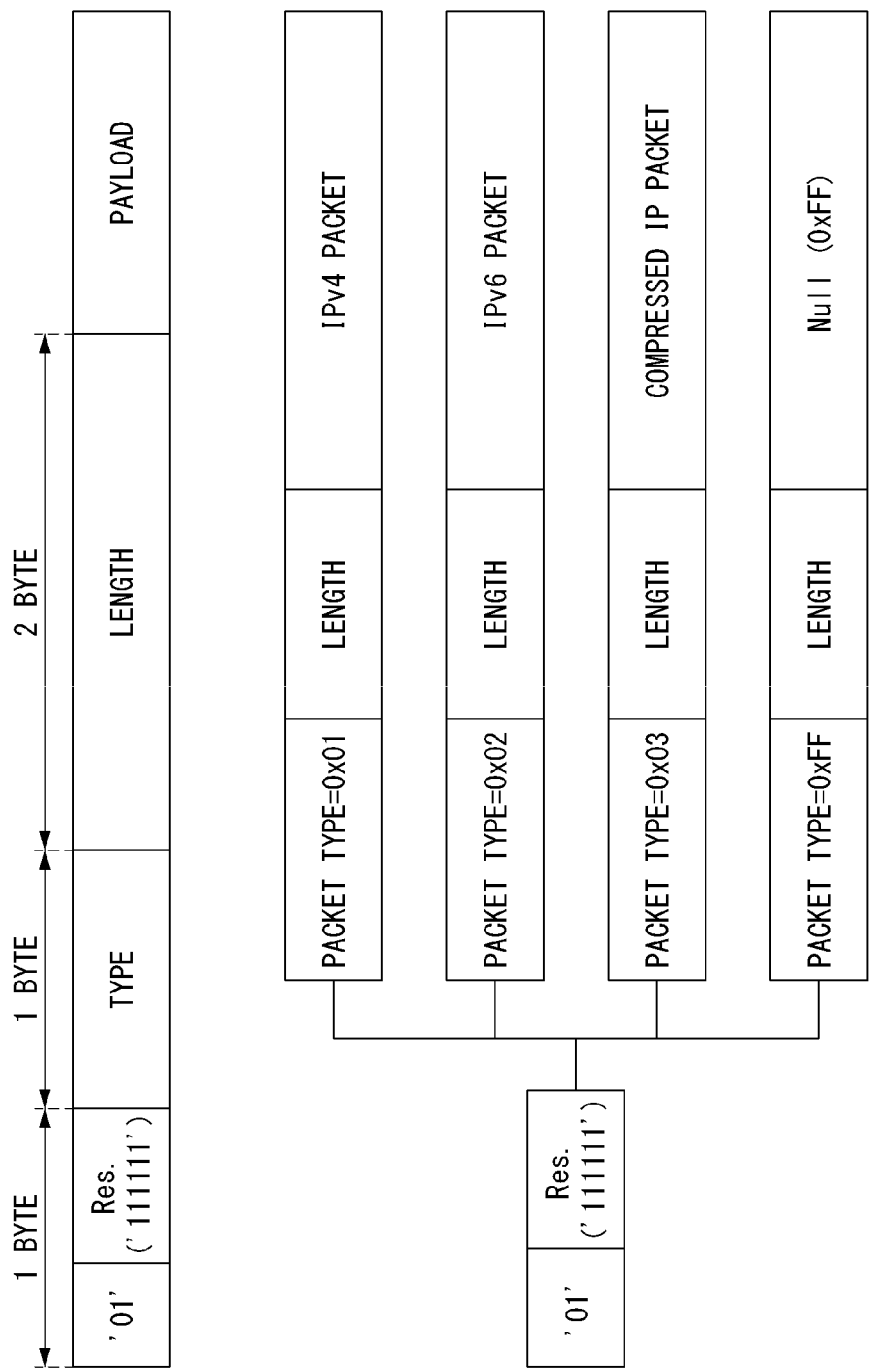

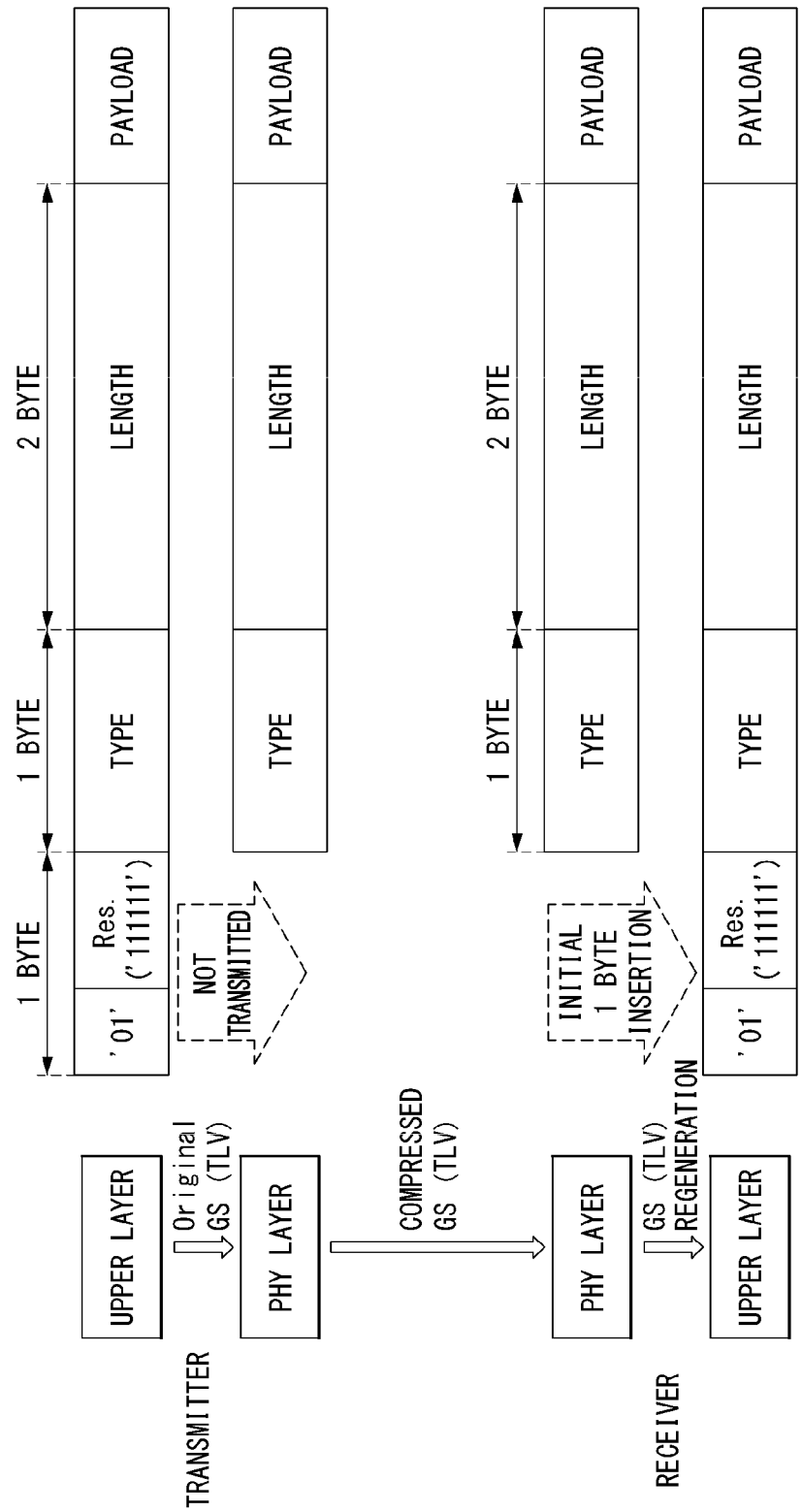
[Figure 30]

[Figure 31]
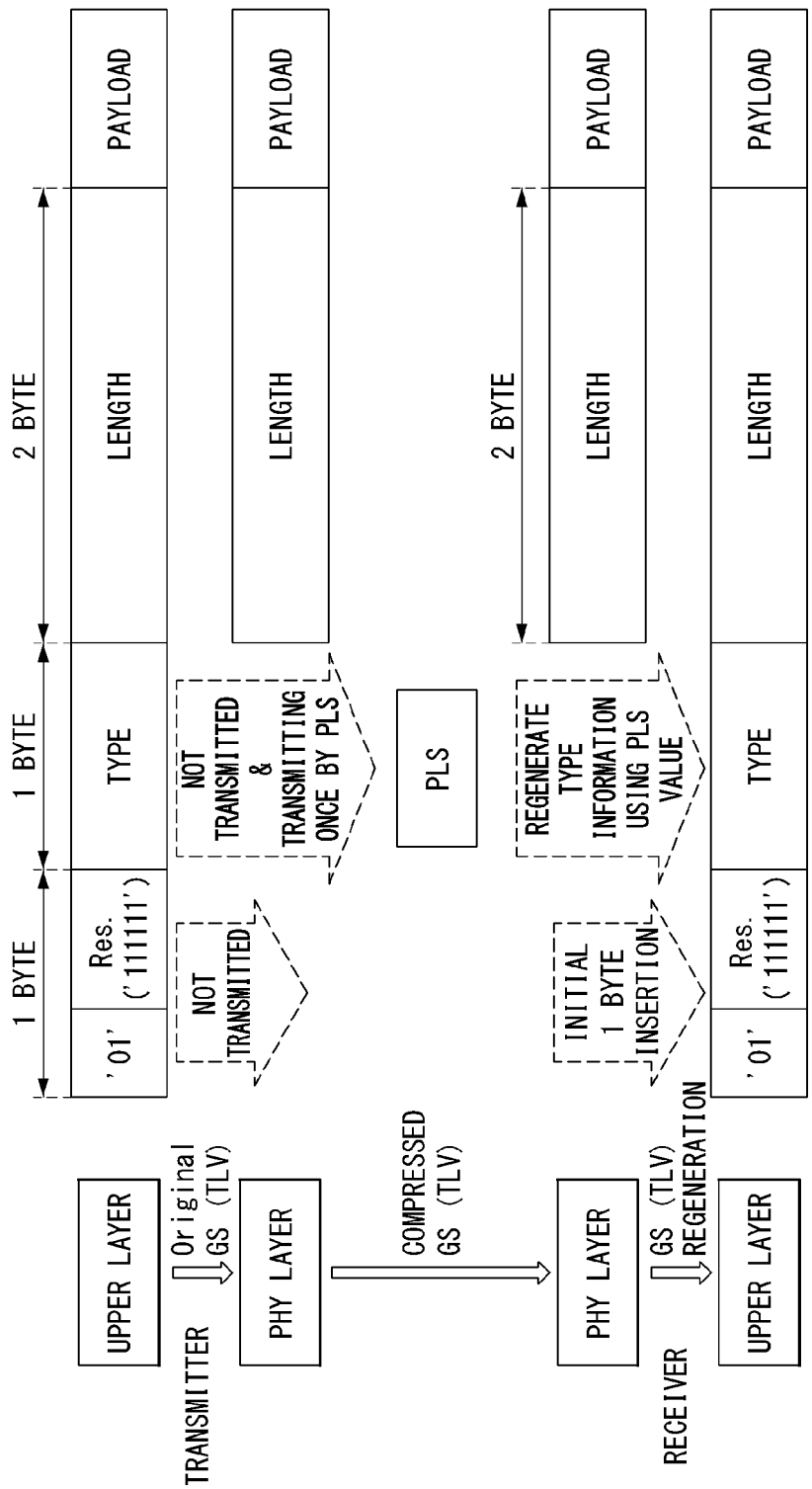

[Figure 32]
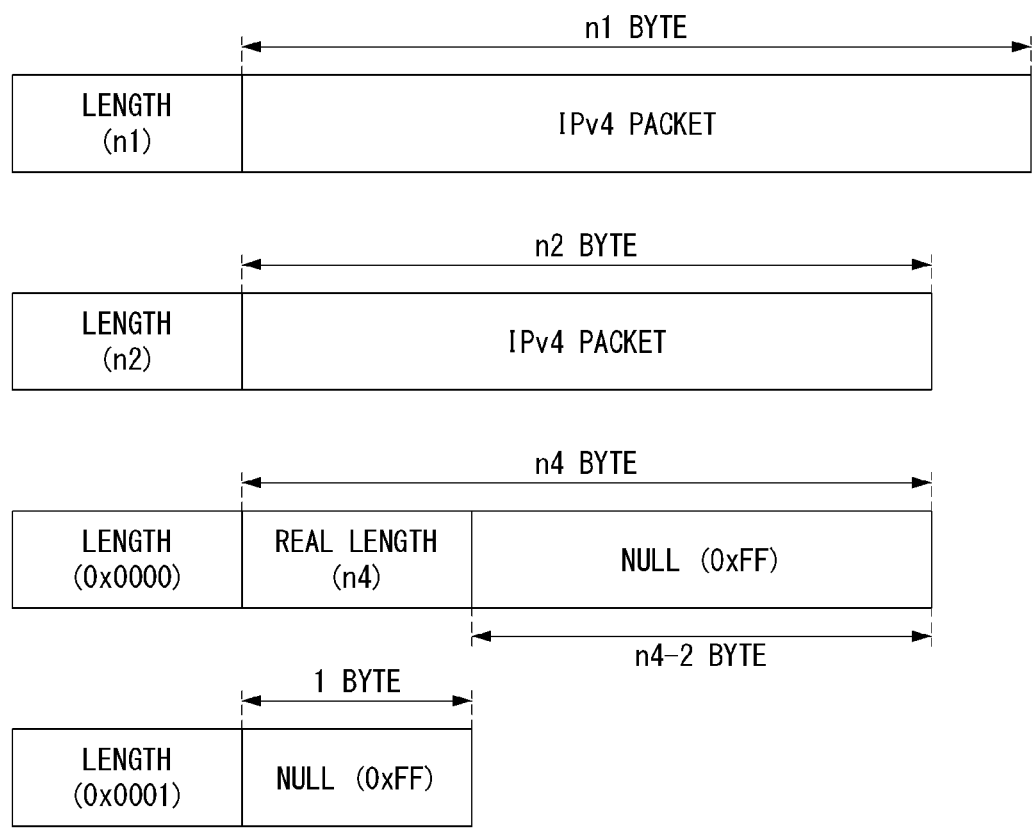

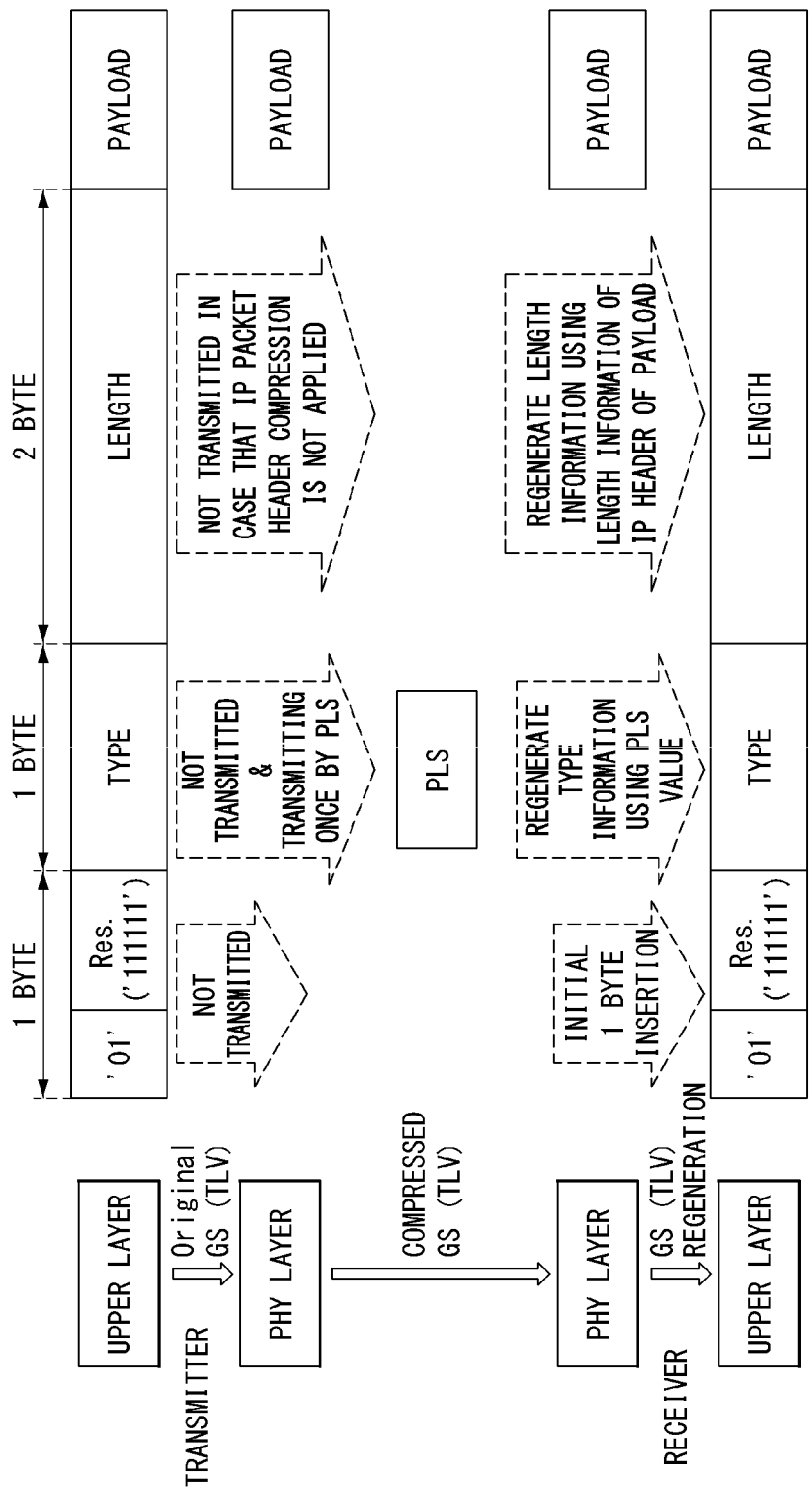
[Figure 33]

[Figure 34]
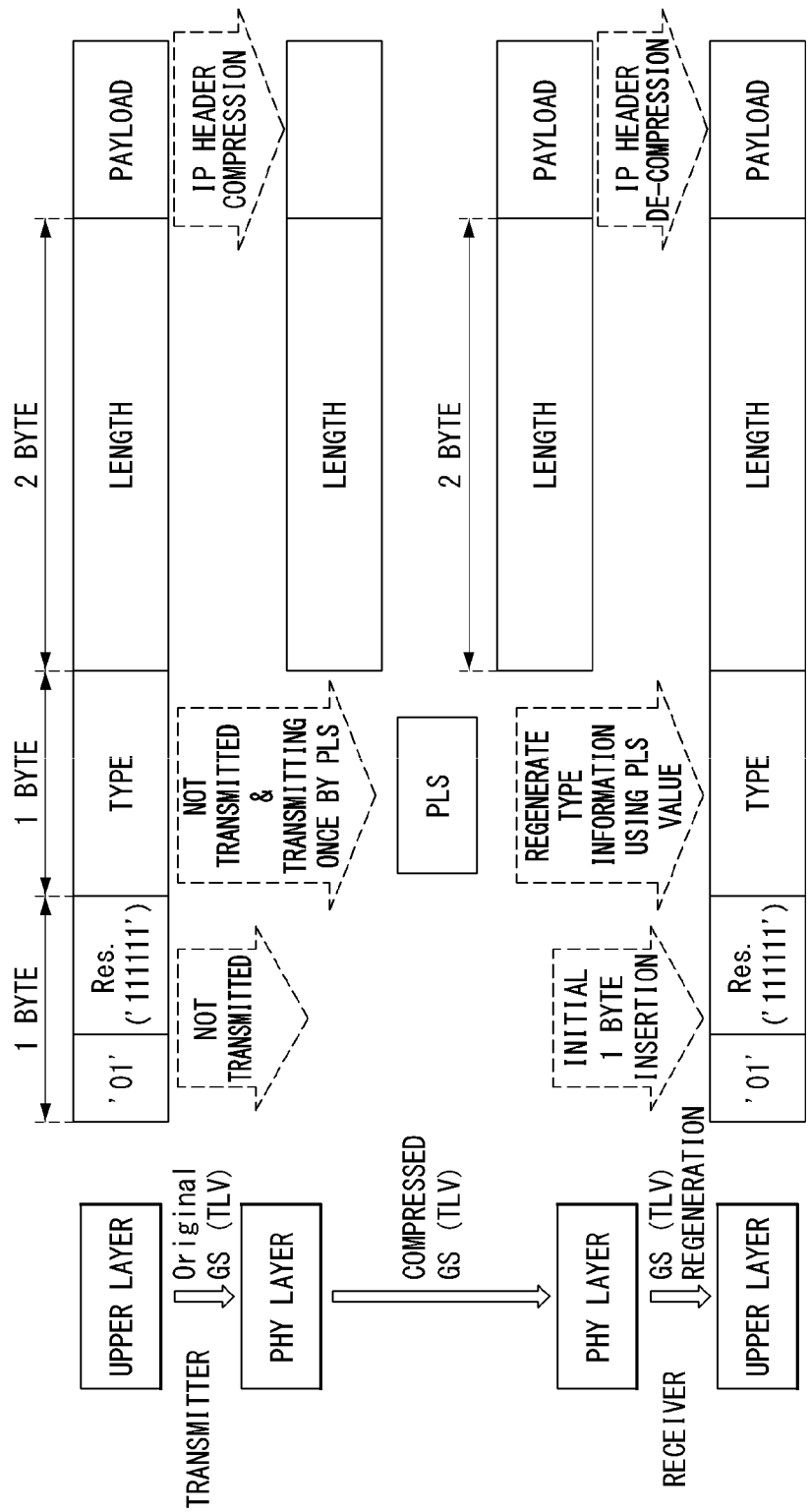

[Figure 35]
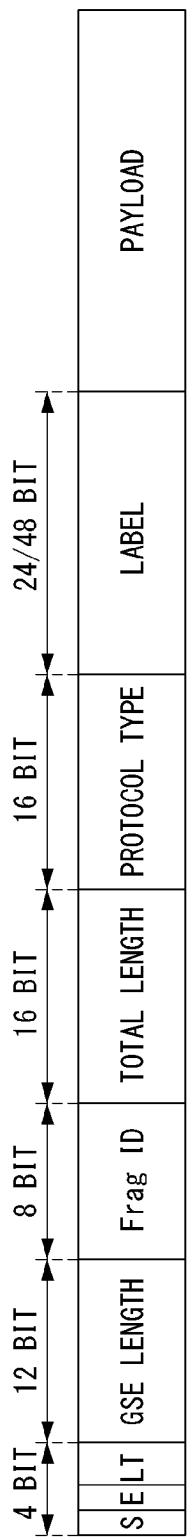

[Figure 36]

(a) PADDING PACKET

| 0 | 0 | 00 | PADDING BIT | PADDING BYTE |
|---|---|---|---|---|

(b) COMPLETE PACKET

| 1 | 0 | 00 ~ 11 | GSE LENGTH | PROTOCOL TYPE | LABEL | PAYLOAD (PDU) |
|---|---|---|---|---|---|---|
| | | | | | | 4byte |

(c) FRAGMENTATION PACKET

| 1 | 0 | 00 ~ 11 | GSE LENGTH | Frag ID | TOTAL LENGTH | PROTOCOL TYPE | LABEL | PAYLOAD (PDU start) |
|---|---|---|---|---|---|---|---|---|
| | | | | | | | | 7byte |

| 0 | 0 | 11 | GSE LENGTH | Frag ID | PAYLOAD (PDU continuation) |
|---|---|---|---|---|---|
| | | | | | 3byte |

| 0 | 1 | 11 | GSE LENGTH | Frag ID | PAYLOAD (PDU end) | CRC |
|---|---|---|---|---|---|---|
| | | | | | | 7byte |

[Figure 37]
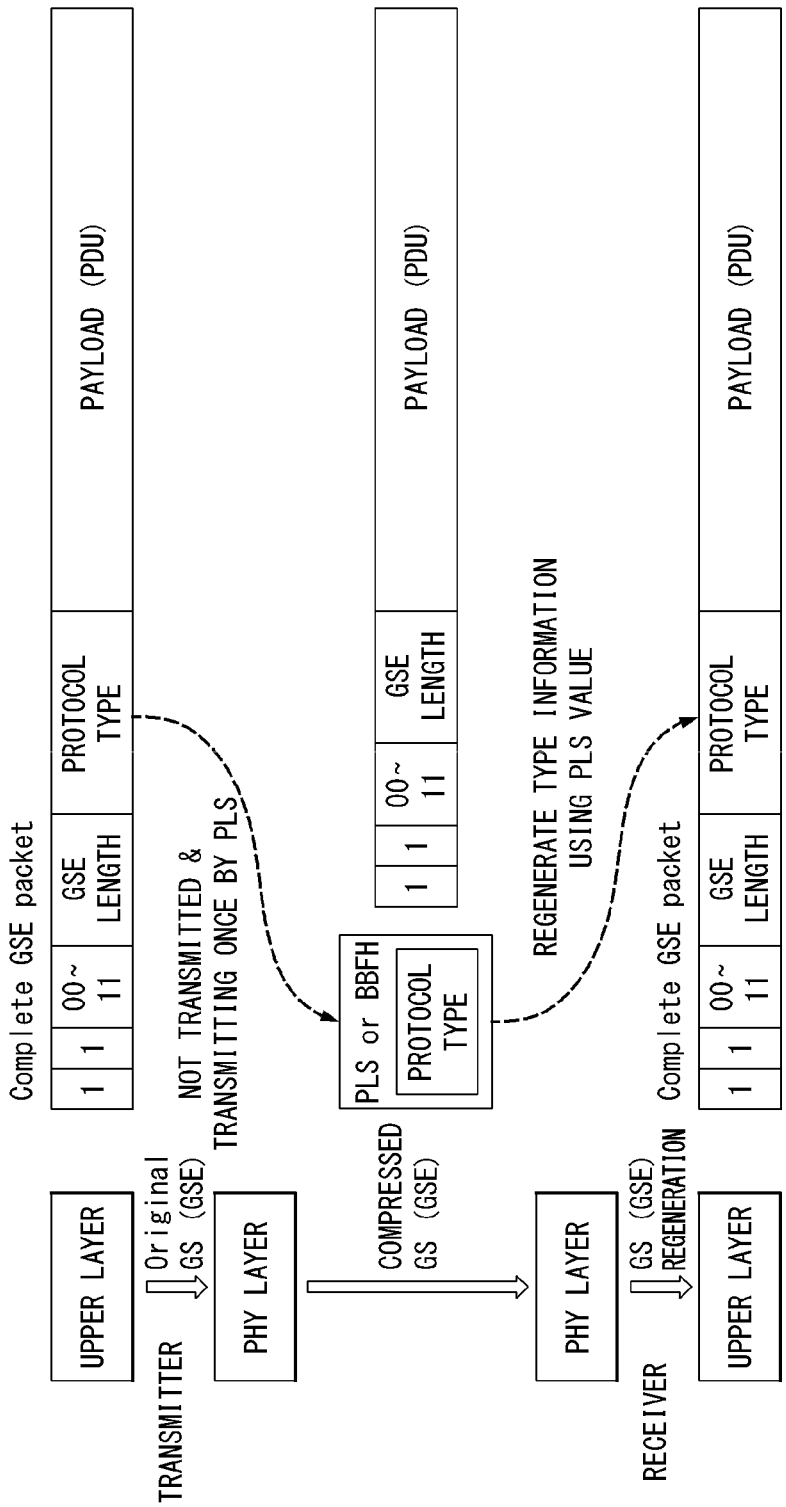

[Figure 38]
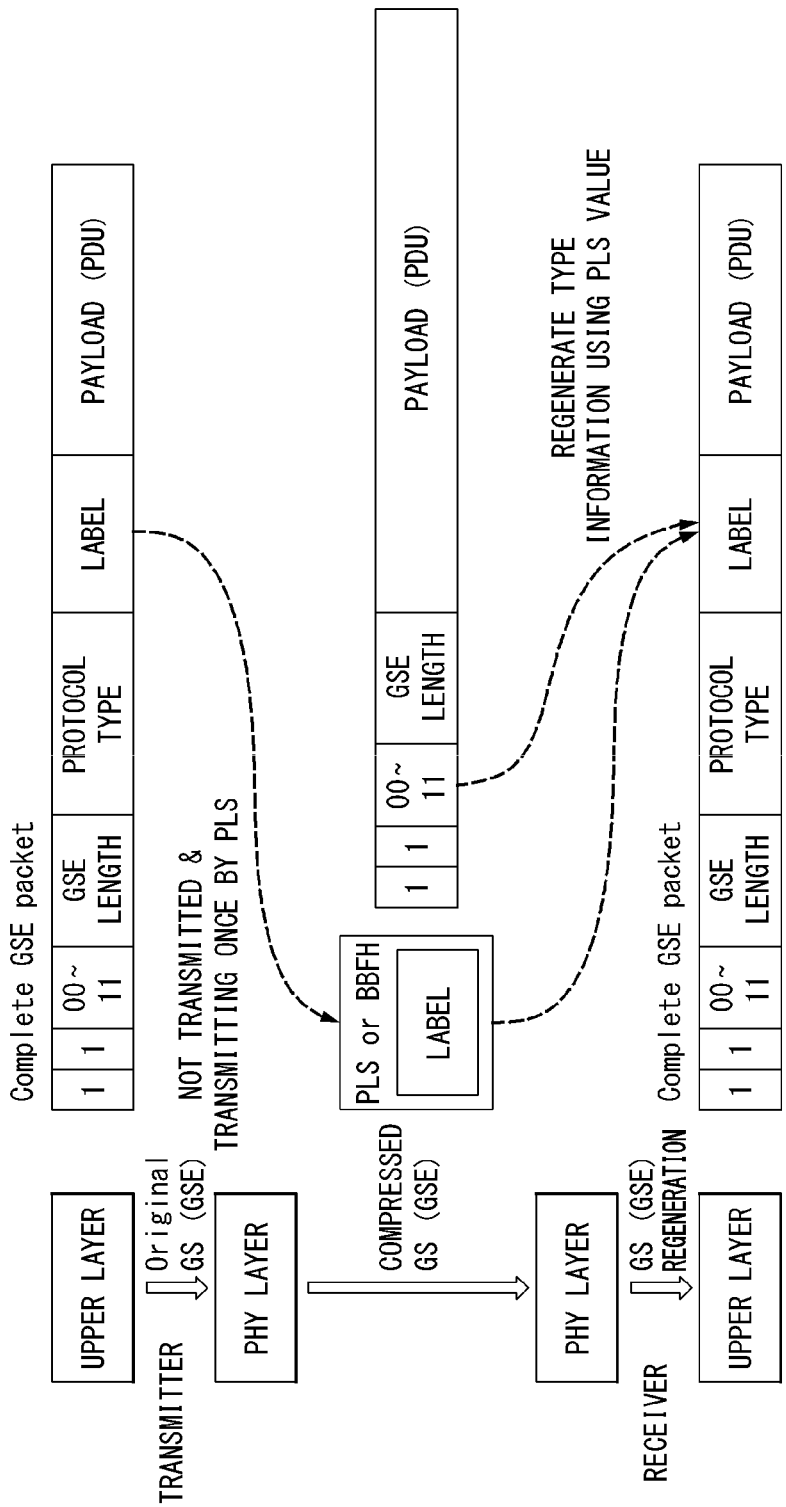

[Figure 39]
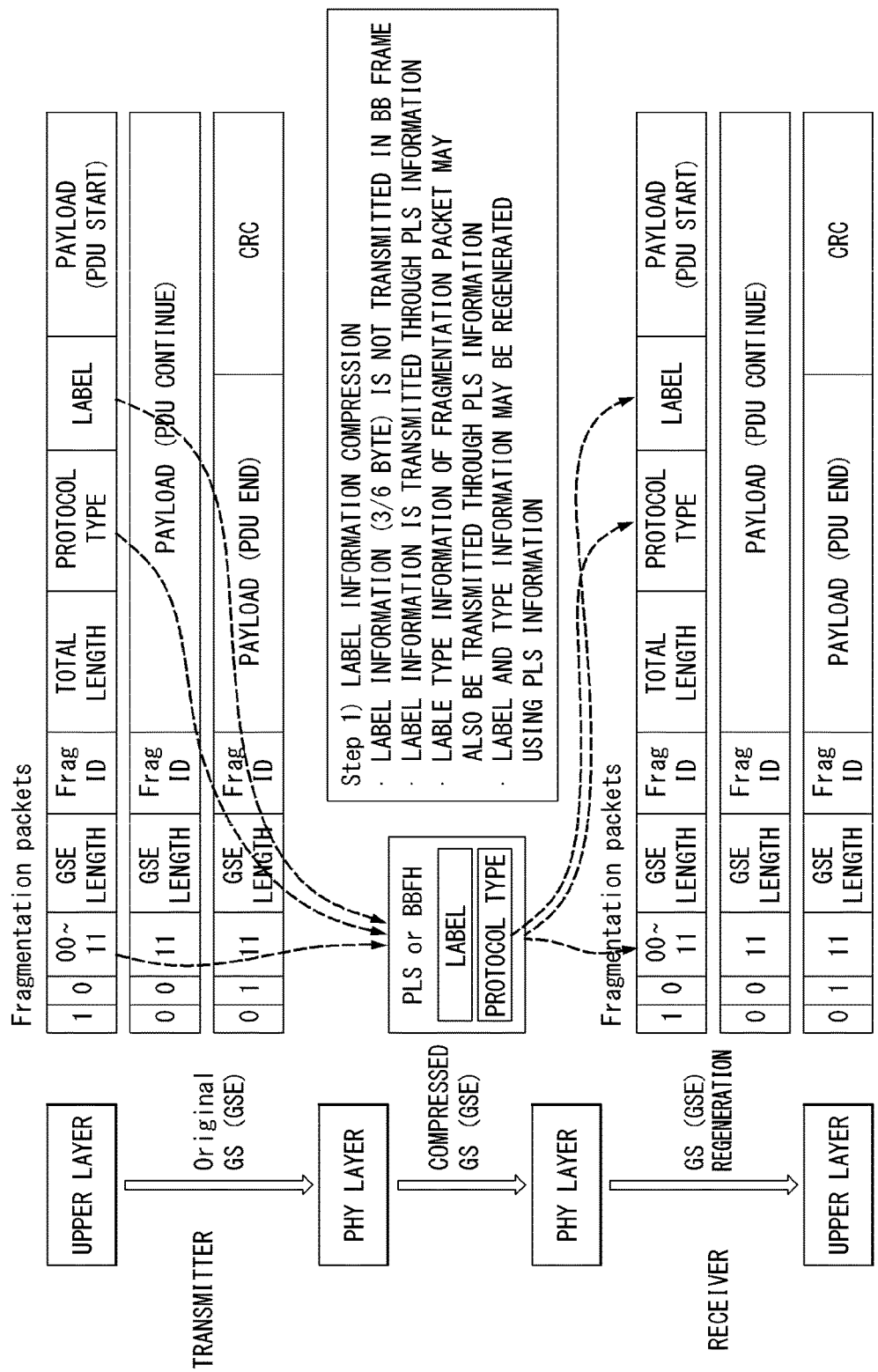

[Figure 40]
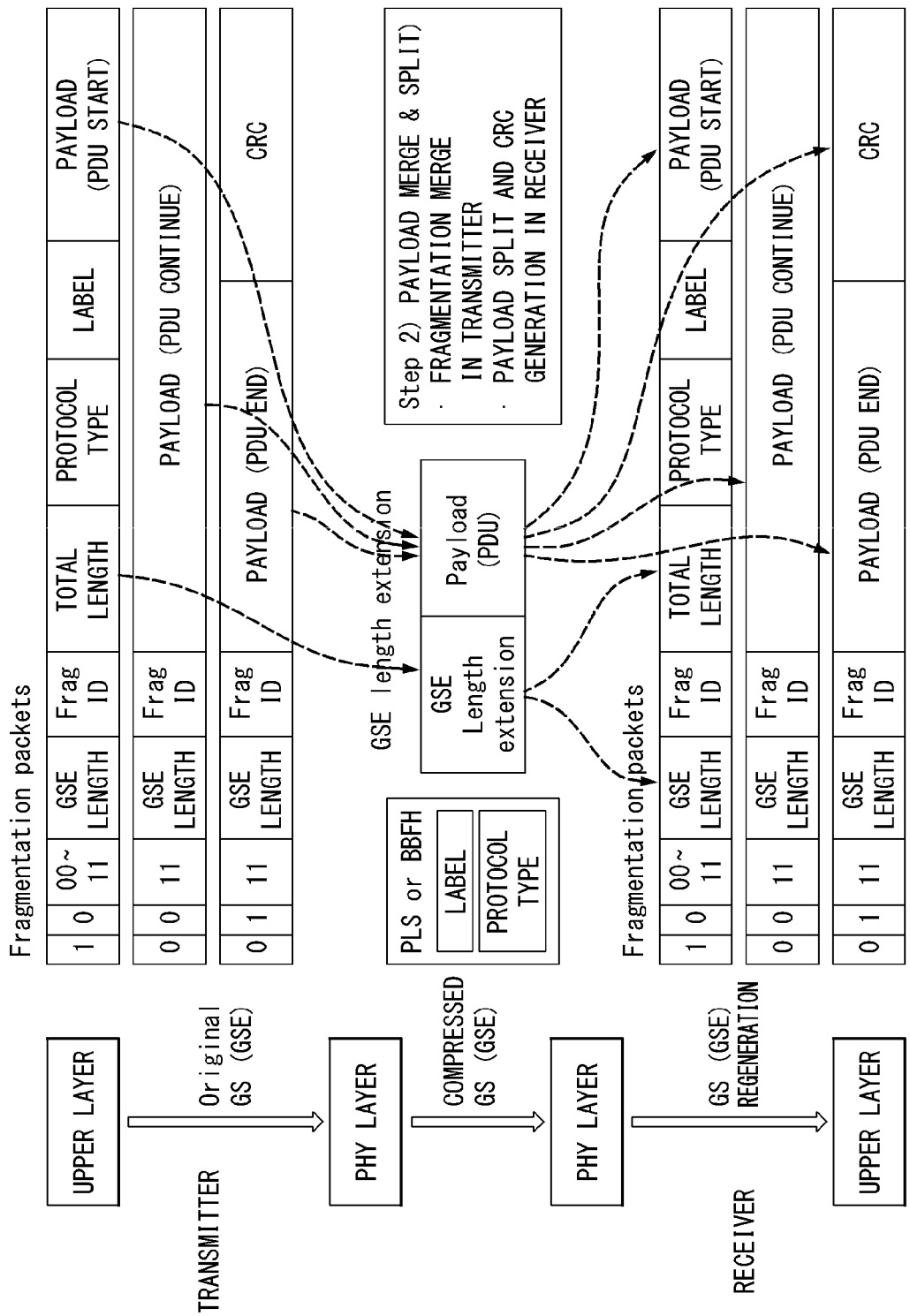

[Figure 41]
◆ PADDING PACKET
(a) PDU PACKET
(b) PADDING PACKET: GSE LENGTH EXTENSION FIELD = '0x0000' CASE
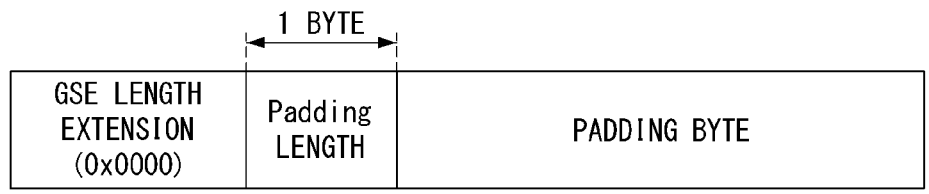
(c) OTHER CONTROL PACKET
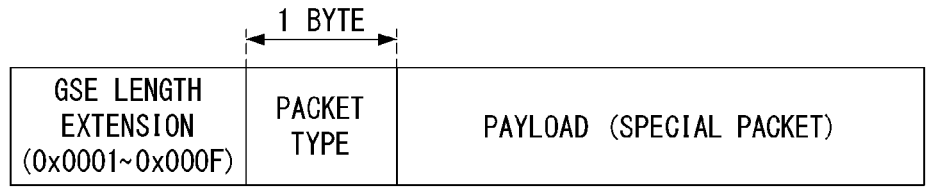

[Figure 42]
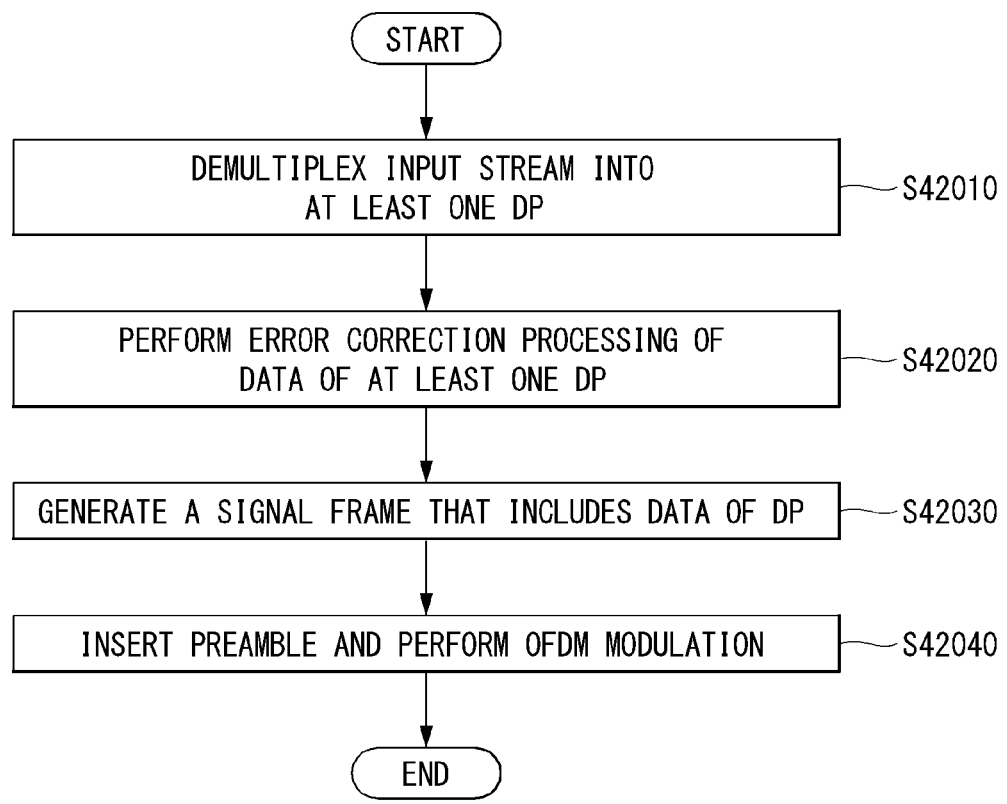

[Figure 43]
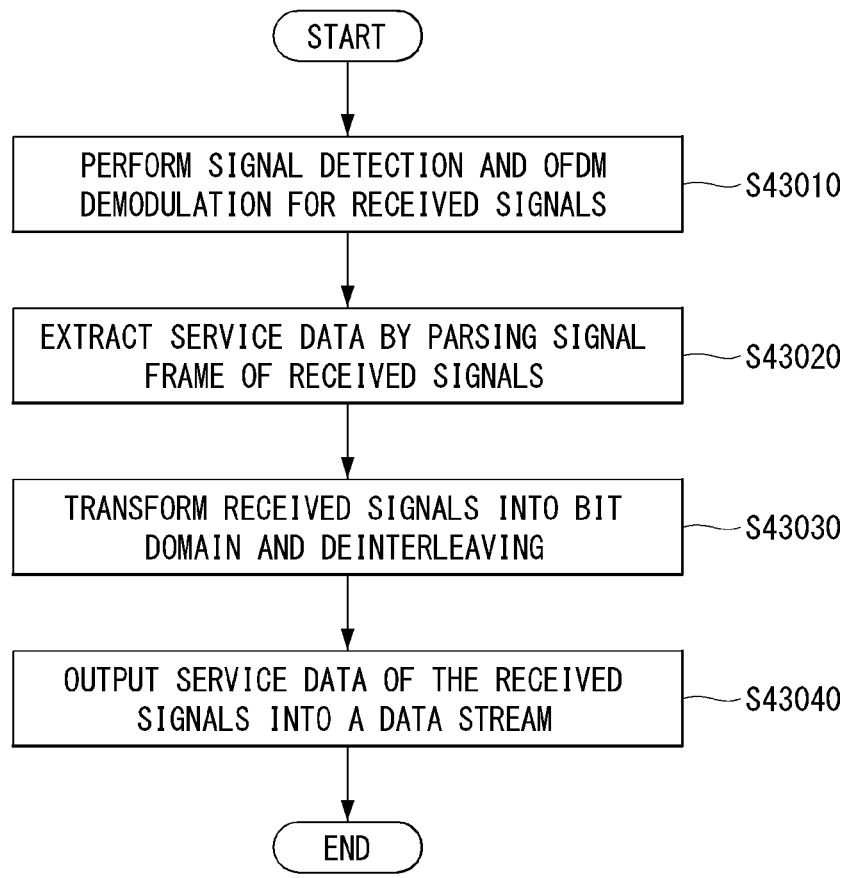

METHOD AND APPARATUS FOR TRANSMITTING AND RECEIVING BROADCAST SIGNAL

CROSS REFERENCE TO RELATED APPLICATIONS

This application is the National Phase of PCT/KR2015/001796 filed on Feb. 25, 2015, which claims priority under 35 U.S.C. § 119(e) to U.S. Provisional Application No. 61/978,969 filed on Apr. 13, 2014 and U.S. Provisional Application No. 61/984,844 filed on Apr. 27, 2014, all of which are hereby expressly incorporated by reference into the present application.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

In an aspect, an apparatus for transmitting a broadcast signal according to the present invention includes: an input formatting module configured to de-multiplex an input stream into at least one Data Pipe (DP); a BICM module configured to perform error correction processing on data of the at least one DP; a frame building module configured to generate a signal frame including the data of the DP; an OFDM generation module configured to generate a transmission broadcast signal by inserting a preamble into the signal frame and performing OFDM modulation; and a signaling generation module configured to generate Physical Layer Signaling (PLS) information, wherein the input formatting module further comprises a header compression module configured to compress headers of packets included in the input stream; a Baseband (BB) frame forming module configured to allocate data of the packets to a BB frame, and a BB frame header insertion module configured to insert a BB frame header into the BB frame.

In addition, in the apparatus for transmitting a broadcast signal according to the present invention, the packet is a Generic Stream Encapsulation (GSE) packet, and the GSE packet includes at least one of a start flag, an end flag, GSE length information, protocol type information and label information.

In addition, in the apparatus for transmitting a broadcast signal according to the present invention, the input formatting module may delete the protocol type information in case that the protocol type of the GSE packets included in the DP or BB frame is identical, and the protocol type information may be transmitted with being included in the PLS information or the BB frame header.

In addition, in the apparatus for transmitting a broadcast signal according to the present invention, the input formatting module may delete the label information in case that the label information of the GSE packets included in the DP or BB frame is identical, and the label information may be transmitted with being included in the PLS information or the BB frame header.

In addition, in the apparatus for transmitting a broadcast signal according to the present invention, the input formatting module may recombine fragmentation packets in case that the at least one GSE packet are the fragmentation packets.

In another aspect, an apparatus for receiving a broadcast signal according to the present invention includes: a synchronization/demodulation module configured to perform signal detection and OFDM demodulation for a received broadcast signal; a frame parsing module configured to extract service data by parsing a signal frame of the received broadcast signal; a demapping/decoding module configured to transform an input signal to a bit domain and perform deinterleaving; an output processing module configured to output a data stream by receiving service data; and a signaling decoding module configured to acquire signaling information by parsing Physical Layer Signaling (PLS) information, wherein the output processing module further comprises a BB frame header parser module configured to parse a BB frame header; a header de-compression module configured to de-compress headers of at least one packet included in the BB frame; and a packet recombining module configured to an output data stream by combining the packets.

In addition, in the apparatus for receiving a broadcast signal according to the present invention, the packet is a Generic Stream Encapsulation (GSE) packet, and the GSE packet may include at least one of a start flag, an end flag, GSE length information, protocol type information and label information.

In addition, in the apparatus for receiving a broadcast signal according to the present invention, the output processing module may recover the protocol type information in case that the protocol type of the GSE packets included in the DP or BB frame is identical, and the protocol type information may be acquired from the PLS information or the BB frame header.

In addition, in the apparatus for receiving a broadcast signal according to the present invention, the output processing module may recover the label information in case that the label information of the GSE packets included in the DP or BB frame is identical, and the label information may be acquired from the PLS information or the BB frame header.

Technical Effects

The method and apparatus for communication in wireless communication systems according to the present invention has the following technical effects.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

According to the present invention, in case of transmitting broadcast signals by performing input formatting GS, transmission efficiency can be improved by compressing the TLV packet header or the GSE packet header.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates a mode adaptation module of a broadcast signal transmitter according to an embodiment of the present invention.

FIG. 27 illustrates an output processor module of a broadcast signal receiver according to an embodiment of the present invention.

FIG. 28 illustrates a method for processing broadcast signals according to an embodiment of the present invention.

FIG. 29 illustrates a TLV encapsulation scheme and a TLV packet according to an embodiment of the present invention.

FIG. 30 illustrates a method for compressing a GS packet according to an embodiment of the present invention.

FIG. 31 illustrates a method for compressing a GS packet according to an embodiment of the present invention.

FIG. 32 illustrates a method for compressing a GS packet according to another embodiment of the present invention.

FIG. 33 illustrates a method for compressing a GS packet according to another embodiment of the present invention.

FIG. 34 illustrates a method for compressing a GS packet according to another embodiment of the present invention.

FIG. 35 illustrates a GSE packet and header information according to an embodiment of the present invention.

FIG. 36 illustrates GSE packets according to another embodiment of the present invention.

FIG. 37 illustrates a method for compressing a GS packet according to another embodiment of the present invention.

FIG. 38 illustrates a method for compressing a GS packet according to another embodiment of the present invention.

FIG. 39 and FIG. 40 illustrate methods for compressing a GS packet according to another embodiment of the present invention.

FIG. 41 illustrates a method for compressing a GS packet according to another embodiment of the present invention.

FIG. 42 illustrates a method for transmitting broadcast signals according to an embodiment of the present invention.

FIG. 43 illustrates a method for transmitting broadcast signals according to an embodiment of the present invention.

BEST MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple services) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudo random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT size.

reserved for future use: not defined by the present document but may be defined in future super frame: set of eight frame repetition units time interleaving block (TI block): set of cells within which time interleaving is carried out, corresponding to one use of the time interleaves memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DR The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DR Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DR A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

*193FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math FIG. 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (= $N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/ reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 9030 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

*242Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110-111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PBY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DR. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DR If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DR The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:
le;.3qIf the DP_TI_TYPE is set to the value this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

TABLE 19

| Value | Payload Type |
| --- | --- |
| 00 | TS |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |

TABLE 23-continued

| Value | Null-packet deletion mode |
|-------|---------------------------|
| 10    | DNP-OFFSET                |
| 11    | reserved                  |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|-------|-----------|
| 00    | Not used  |
| 01    | ISSY-UP   |
| 10    | ISSY-BBF  |
| 11    | reserved  |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|-------|-------------------------|
| 00    | HC_MODE_TS 1            |
| 01    | HC_MODE_TS 2            |
| 10    | HC_MODE_TS 3            |
| 11    | HC_MODE_TS 4            |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|-------|-------------------------|
| 00    | No compression          |
| 01    | HC_MODE_IP 1            |
| 10~11 | reserved                |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

*392DP_START: This 15-bit (or 13-bit) field indicates the start position of the first of the DPs using the DPU addressing scheme. The DP_START field has differing length according to the PHY profile and FFT size as shown in the below table 27.

TABLE 27

|             | DP_START field size | |
|-------------|---------------------|---|
| PHY profile | 64K                 | 16K |
| Base        | 13 bit              | 15 bit |
| Handheld    | —                   | 13 bit |
| Advanced    | 13 bit              | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DR Therefore, no additional description is required for a base DR The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

FIG. 20 shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1} + D_{DP2} \leq D_{DP} \quad \text{[Math FIG. 2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, . . . , DDP1−1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2−1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |

TABLE 29-continued

| LDPC Rate | $N_{ldpc}$ | $K_{ldpc}$ | $K_{bch}$ | BCH error correction capability | $N_{bch} - K_{bch}$ |
|---|---|---|---|---|---|
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc}=[I_{ldpc}P_{ldpc}]=[i_0,i_1,\ldots i_{K_{ldpc}-1},p_0,p_1,\ldots,p_{N_{ldpc}-K_{ldpc}-1}]$$ [Math FIG. 3]

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits, $$p_0=p_1=p_2=\ldots=p_{N_{ldpc}-K_{ldpc}-1}=0$$ [Math FIG. 4]

2) Accumulate the first information bit—i0, at parity bit addresses specified in the first row of an addresses of parity check matrix. The details of addresses of parity check matrix will be described later. For example, for rate 13/15:

$$p_{983}=p_{983}\oplus i_0, p_{2815}=p_{2815}\oplus i_0$$

$$p_{4837}=p_{4837}\oplus i_0, p_{4989}=p_{4989}\oplus i_0$$

$$p_{6138}=p_{6138}\oplus i_0, p_{6458}=p_{6458}\oplus i_0$$

$$p_{6921}=p_{6921}\oplus i_0, p_{6974}=p_{6974}\oplus i_0$$

$$p_{7572}=p_{7572}\oplus i_0, p_{8260}=p_{8260}\oplus i_0$$

$$p_{8496}=p_{8496}\oplus i_0$$ [Math FIGS. 5]

3) For the next 359 information bits, is, s=1, 2, . . . , 359 accumulate is at parity bit addresses using following Math figure.

$$\{x+(s\bmod 360)\times Q_{ldpc}\}\bmod(N_{ldpc}-K_{ldpc})$$ [Math FIG. 6]

where x denotes the address of the parity bit accumulator corresponding to the first bit i0, and $Q_{ldpc}$ is a code rate dependent constant specified in the addresses of parity check matrix. Continuing with the example, $Q_{ldpc}=24$ for rate 13/15, so for information bit i1, the following operations are performed:

$$p_{1007}=p_{1007}\oplus i_1, p_{2839}=p_{2839}\oplus i_1$$

$$p_{4861}=p_{4861}\oplus i_1, p_{5013}=p_{5013}\oplus i_1$$

$$p_{6162}=p_{6162}\oplus i_1, p_{6482}=p_{6482}\oplus i_1$$

$$p_{6945}=p_{6945}\oplus i_1, p_{6998}=p_{6998}\oplus i_1$$

$$p_{7596}=p_{7596}\oplus i_1, p_{8284}=p_{8284}\oplus i_1$$

$$p_{8520}=p_{8520}\oplus i_1$$ [Math FIGS. 7]

4) For the 361st information bit i360, the addresses of the parity bit accumulators are given in the second row of the addresses of parity check matrix. In a similar manner the addresses of the parity bit accumulators for the following 359 information bits is, s=361, 362, 719 are obtained using the Math FIG. 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

*469After all of the information bits are exhausted, the final parity bits are obtained as follows:

6) Sequentially perform the following operations starting with i=1

$$p_i=p_i\oplus p_{i-1}, i=1,2,\ldots,N_{ldpc}-K_{ldpc}-1$$ [Math FIG. 8]

where final content of pi, i=0, 1, . . . $N_{ldpc}-K_{ldpc}-1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}$=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, $N_{QCB\_IG}$, is also defined.

TABLE 32

| Modulation type | $η_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word (c0,l, c1,l, . . . , c η mod mod-1,l) of the bit interleaving output is demultiplexed into (d1,0,m, d1,1,m . . . , d1, η mod mod-1,m) and (d2,0,m, d2,1,m . . . , d2, η mod mod-1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,l, c1,l, . . . , c9,l) of the Bit Interleaver output is demultiplexed into (d1,0,m, d1,1,m . . . , d1,3,m) and (d2,0,m, d2,1,m . . . , d2,5,m), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cell}-1}, d_{n,s,1,0}, \ldots, d_{n,s,1,N_{cell}-1},$$
$$\ldots, d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the $q_{th}$ cell of the $r^{th}$ XFECBLOCK in the $s^{th}$ TI block of the $n^{th}$ TI group and represents the outputs of SSD and MIMO encodings as follows $$d_{n,s,r,q} = \begin{cases} f_{n,s,r,q}, & \text{the output of } SSD \ldots \text{encoding} \\ g_{n,s,r,q}, & \text{the output of } MIMO \text{ encoding} \end{cases}$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1})$$

where $h_{n,s,i}$ is the $i^{th}$ output cell (for i=0, . . . , $N_{xBLOCK\_TI}$ (n,s)×$N_{cells}$−1) in the $s^{th}$ TI block of the $n^{th}$ TI group.

Typically, the time interleaver will also act as a buffer for DP data prior to the process of frame building. This is achieved by means of two memory banks for each DR The first TI-block is written to the first bank. The second TI-block is written to the second bank while the first bank is being read from and so on.

The TI is a twisted row-column block interleaver. For the $s^{th}$ TI block of the $n^{th}$ TI group, the number of rows $N_r$ of a TI memory is equal to the number of cells $N_{cell}$, i.e., $N_r=N_{cell}$ while the number of columns $N_c$ is equal to the number $N_{xBLOCK\_TI}$(n,s).

Hereinafter, in the method for transmitting and receiving broadcast signals described above, an input formatting module/a step of formatting input and an output formatting module/a step of formatting output will be additionally described.

As described above in relation to FIG. 1, an input formatting module 1000 may demultiplex an input stream into at least one data pipes, and the input stream may be inputted as IP stream/packets, MPEG-2 TS, a type of Generic Stream/General Stream. And the input formatting module, as shown in FIG. 2 to FIG. 4, may include a mode adaptation module 2000 and a stream adaptation module 2010. As shown in FIG. 2 and FIG. 3, the mode adaptation module 2000 may slice the inputted data stream and insert this into a data field of a BaseBand (BB) frame. And, hereinafter, operations of a broadcast signal transmitter and a broadcast signal receiver in case that the input and output stream is Generic/General Stream (GS) will be described. In this specification, the broadcast signal transmitter may also be referred to a broadcast transmitter or an apparatus for transmitting broadcast signals, and the broadcast signal receiver may also be referred to a broadcast receiver or an apparatus for receiving broadcast signals.

FIG. 26 illustrates a mode adaptation module of a broadcast signal transmitter according to an embodiment of the present invention.

The mode adaptation module of FIG. 26 is included in the input formatting module of FIG. 1, and shows another example of the mode adaptation module shown in FIG. 2 and FIG. 3.

The mode adaptation module of FIG. 26 processes multiple input streams, and slices the incoming data stream and inserts this into the data field of the BaseBand frame as described above by reference to FIG. 2 and FIG. 3. A block/module that corresponds to the block/module described in FIG. 2 and FIG. 3 will be briefly described.

A pre processing module 26010 may also be referred to an input stream splitter module, and splits an input data stream into multiple services or service components. An input interface module 26020 may map input data to an internal logical-bit format. An input stream synchronizer module 26030 may also referred to an ISSY, and provides a means (ISSY information) for guaranteeing Constant Bit Rate (CBR) and constant end-to-end transmission delay. A compensating delay module 26040 makes a receiver perform a TS packet recombination mechanism by delaying split TS packets which is subsequent from the ISSY information input. A null packet deletion module 26060 is used only in case that the input stream is the TS input stream. The input interface module 26020 in FIG. 26 and other modules 26030, 26040 and 26060 denoted by other dotted lines may be used only in case that the input stream is the TS input stream, and may be omitted or may bypass the input data in case of processing the GS stream/IP packet as the case of the present invention.

As described above, a header compression module 26050 may increase a transmission efficiency of the input stream by performing a packet compression. In particular, the header compression module 26050 may increase a transmission rate by compressing a header of a TLV packet or a GSE packet, and this will be described in detail below.

A BB frame header insertion module 26070 may insert a BB frame header into a front end of the BB frame. In FIG. 26, the BB frame header insertion module may also perform the role of the BB frame slicer 3060 of FIG. 3 together. However, according to an embodiment, the BB frame slicer may be separately provided, and in this case, the BB frame slicer may allocate data of IP packets to a payload of the BB frame, and the BB frame header insertion module 26070 may insert the BB frame header in front of the payload of the BB frame.

In the present invention, the BB frame header insertion module 26070 may insert the information related to the header compression used in the header compression module 26050 into the BB frame header, and the header compression information may include type information in case of the TLV packet, and include at least one of protocol type information and label information in case of the GSE packet. In other words, the information transmitted through the BB frame header or the PLS information instead of being deleted/compressed in a header may be referred to the header compression information, and this will be described in more detail below.

FIG. 27 illustrates an output processor module of a broadcast signal receiver according to an embodiment of the present invention.

The output processor module shown in FIG. 27 may correspond to the output processor module 9030 of the broadcast signal receiver of FIG. 9.

The output processor module may include at least one of BB frame header parser module 27010, a null packet insertion module 27020, a header de-compression module 27030, a de-jitter buffer module 27040, a packet recombining module 27050 or a TS clock regeneration module 27060. Particularly, the null packet insertion module 27020, the de-jitter buffer module 27040 and the TS clock regeneration module 27060 may be omitted or may bypass the input data in case of processing the GS stream/IP packet as the case of the present invention.

The BB frame header parser module 27010 may acquire various signaling information by parsing data of a header part included in the BB frame. In the present invention, the BB frame header parser module 27010 may also acquire the header compression information by parsing the BB frame header.

The header de-compression module 27030 may de-compress the packet headers which are compressed in a transmitter. At the moment, a receiver may decode the packet header by recovering/regenerating the parts of the packet headers which are compressed/deleted, by acquiring the header compression information from the BB frame header using the header de-compression module 27030 or by using the header compression information acquired from the PSL information using the signal decoding module 9040. A method for recovering/regenerating the TLV packet header/GS packet header will be described in more detail below.

The packet recombining module 27050 may output GS by combining GS packets. The GS may be outputted by being recovered as a service unit.

FIG. 28 illustrates a method for processing broadcast signals according to an embodiment of the present invention.

In a broadcast system, a broadcast transmitter may modulate and transmit broadcast signals in a physical layer (PHY layer), and a broadcast receiver may receive and demodulate broadcast signals in a physical layer (PHY layer). The broadcast transmitter receives input signals of various forms from a upper layer and generates BB frames in the physical layer. The input signals may include transport stream (TS) packets, IP packets and generic stream packets.

In case that the broadcast system transmits and receives the TS packets and the IP packets, the broadcast system may compress and de-compress (cancel compression/recover) each packet header in order to increase transmission efficiency. Particularly, hereinafter, in case that an input packet is GS, a method for compressing packets at a transmitter and de-compressing packets at a receiver will be described.

The schemes for encapsulating the packets transmitted as GS includes TLV scheme and GSE scheme. Hereinafter, a packet compressing method for each scheme will be described below.

First, in FIG. 29 to FIG. 34, a method for compressing input packets will be described in case that data transmitted as GS are TLV packets encapsulated by the TLV scheme.

FIG. 29 illustrates a TLV encapsulation scheme and a TLV packet according to an embodiment of the present invention.

As shown in FIG. 29, the type length value (TLV) scheme encapsulates input data by adding a header of 4 bytes, and the header includes start information (start byte; 1 byte), type information (type byte; 1 byte) and length information (length byte; 2 bytes).

The start information (field) is 1 byte that represents a start of TLV packet, and includes '01' and Reserved '111111'. The Reserved is denoted by "111111" currently, and this field is a reserved field for later extendibility. In the present specification, the start information may be described by 1 byte that includes the start field and the Reserved field.

The type information (field) represents a type of payload which is encapsulated, and may be constructed by 1 byte. For example, a field value is set to 0x01 in case that the packet type of payload is IPv4, set to 0x02 in case that the packet type of payload is IPv6, set to 0x03 in case that the packet type of payload is compressed IP packet, such that each packet type may be represented by the type information. In case of sending Null data as the payload, the packet type information represents 0xFF, and the payload is filled by 0xFF.

The length information (field) represents a length of payload, and may be constructed by 2 bytes.

As described above, the TLV scheme performs encapsulation by adding a TLV header of 4 bytes to the input data. Although this scheme is useful for a transmission, this scheme has a disadvantage that a header of 4 bytes is added for each packet in an aspect of transmission efficiency. Accordingly, hereinafter, a method for compressing a TLV packet in case of transmitting the GS input by encapsulating in the TLV scheme will be described.

FIG. 30 illustrates a method for compressing a GS packet according to an embodiment of the present invention.

As an embodiment of a method for compressing a GS packet which is encapsulated by the TLV scheme, FIG. 30 illustrates a method for deleting/compressing the start information (field).

As shown in FIG. 30, a transmitter may compress the GS packet encapsulated by the TLV scheme which is received from a upper layer in a physical layer. The transmitter may perform the compression in the physical layer by the method of deleting '01' and '111111' which is the start byte in a header of the TLV packet when generating a BB frame. In other words, in case that a target GS packet is the TLV packet, the method is to delete the start information when generating the BB frame in an input formatting module of the transmitter, and to recover the start information ('01111111') in an output processing module of a receiver.

In case of using such a method, headers of all TLV packets may be transmitted with being reduced from 4 bytes to 3 bytes.

FIG. 31 illustrates a method for compressing a GS packet according to an embodiment of the present invention.

As an embodiment of a method for compressing a GS packet which is encapsulated by the TLV scheme, FIG. 31 illustrates a method for deleting/compressing the type information in addition to deleting/compressing the start information (byte).

In the data that corresponds to one service, a payload may have an IP header form which is compressed by IPv4 or IPv6. As such, in case that the data included in one BB frame or an example are streams of the same type or packets of the same type, the type information may be transmitted only once through the PLS information, and the type information may be deleted in a TLV header and may not be transmitted. In other words, in case that a payload of a TLV packet included in a BB frame when building the BB frame is of a type, a transmitter may delete the type information of the TLV packet and transmit the PLS information by adding a type of packet (e.g., IPv4 or IPv6) included in the BB frame to the PLS information.

In the present specification, as described above, the PLS information is information that represents an attribute or a parameter of physical layer, and includes PLS1 and PLS2 information, and may also include BB frame header information.

A receiver may perform a reverse operation of the input formatting module of the transmitter in the output processing module. The receiver may acquire type information of the packets included in the BB frame through the PLS information, and through this, may regenerate type information of the TLV packets. In this case, in case that a type field at the receiver is Null packet, a TLV signal may be regenerated by modifying the length information. As described above, the start information of the TLV packets may be regenerated.

In case of deleting/compressing the start information and the type information as shown in FIG. 31, a header capacity of all TLV packets may be decreased from 4 bytes to 2 bytes.

FIG. 32 illustrates a method for compressing a GS packet according to another embodiment of the present invention.

In addition to the embodiment of FIG. 31, FIG. 32 is an embodiment for the case that a packet type of payload which is transmitted is Null packet.

In order to adjust a data rate in the TLV encapsulation, Null data may be inserted, and in this case, it may be difficult in signaling a type of data in frame using one type information. Accordingly, in case that Null packet is incoming to the payload, a method is proposed to perform signaling the type by using the length information instead of the type information, and to insert real length information into the payload.

In the present invention, in case that payload data is Null packet, it is implemented to indicate the length information which is not used in case of a data packet, and to indicate real packet length in first 2 bytes among Null data. As an embodiment, in the length information, 0x0001 is indicated in case that a length of Null packet is shorter than 2 bytes, and Null data of 1 byte may be inserted. In addition, in case that a length of Null packet is longer than 2 bytes (in case of n4 bytes), 0x0000 is indicated in the length field, and the length information of the Null packet before being compressed is transmitted by allocating the latter part of 2 bytes to the real length information (real_length field), and the latter packet may be filled with Null data of n4-2 bytes.

In a receiver, original signals may be recovered using the type information acquired through the PLS information and the initial length information of the compressed TLV packet. In case that the length information value is not 0x0000 or 0x0001, the original signals may be recovered by inserting a type value acquired from the PLS information into the type information as packets for transmitting data.

At the receiver, in case that the length information is 0x0000 or 0x0001, the payload may be determined to be Null packet, and 0xFF value may be applied to the type information. In case that the length information value is 0x0001, Null packet is 1 byte, and the length information value may be set to 0x0001. In case that the length information value is 0x0000, Null packet is 2 byte or more, and following value of two bytes is recovered as the length information value. And the field used for representing real length information may be filled by 0xFF again.

FIG. 33 illustrates a method for compressing a GS packet according to another embodiment of the present invention.

As an embodiment of a method for compressing a GS packet which is encapsulated by the TLV scheme, FIG. 33 shows a method for deleting/compressing the length information in addition to deleting/compressing the start information (byte) and the type information.

FIG. 33 shows the case that only the IP packet in which a payload transmitted through the TLV encapsulation is not compressed is existed. In this case, a TLV header may be overhead. This is because, in case of IPv4 or IPv6 packet, the length information of the packet is already included in the header itself of the packets. Accordingly, in this case, when transmitting the BB frame, all of the start byte, the type field and the length field may be deleted. In this case, 4 bytes may be saved for all TLV headers, and an IP transmission method such as IP repacking may also be used.

FIG. 34 illustrates a method for compressing a GS packet according to another embodiment of the present invention.

As an embodiment of a method for compressing a GS packet which is encapsulated by the TLV scheme, FIG. 34 shows a method for performing a compression in case that an IP header compression block is existed in a physical layer In addition to the method of FIG. 33.

In the embodiment of FIG. 34, a transmitter may compress an IP packet included in a payload using an algorithm such as ROHC, and transmit length information of the packet using length information of the existing TLV. In such a case, the size of existing TLV header may be decreased from 4 bytes to 2 bytes, and there is an advantage of obtaining an additional compression effect through an additional IP header compression of the payload.

In FIG. 35 to FIG. 41 below, in case that the data transmitted as GS are GSE packets which are encapsulated by a generic stream encapsulation (GSE) scheme, a method form compressing an input packet will be described.

FIG. 35 illustrates a GSE packet and header information according to an embodiment of the present invention.

In the GSE scheme, a GSE header is added to a payload, and the GSE header includes fields (information) as shown in FIG. 35. The description for the fields is as follows. The GSE header may include a fixed field region of 2 bytes that includes a Start flag S, an End flag E, a Label Type LT and a GSE Length and a variable field region that may be changed depending on a type of packet.

The Start flag and the End flag are flags that represent a start and an end of packet, respectively, and 1 bit may be allocated to each flag.

The Label Type field represents a type of label, and a size and a presence of the Label field are decided depending on the type of label. The field values and the meanings (indicators) of the Label Type field are as following table.

TABLE 34

| Value | Meaning |
|---|---|
| "00" | Representing a label of 6 bytes is existed and this will be used for filtering |
| "01" | Representing a label of 3 bytes is existed and this will be used for filtering |
| "10" | Broadcast. Label field is not existed. All receivers should process this GSE packet. Although a filtering in layer 2 is not applied to this combination, this combination may also be used in a non-broadcast system in which an IP header processing is used. |
| "11" | Label reuse. Label field is not existed. All receivers reuse the label existed in a start of the same BaseBand frame or a complete GSE packet. This method is used for transmitting a sequence of GSE packets that includes the same label without repeating Label field. This value is not used for the first GSE packet of a frame. |

12 bits are allocated to the GSE Length field, and the GSE Length field may express up to maximum 4096 bytes, and in order to transmit more packets over the maximum, the packet should be transmitted with being fragmented by fragmenting the packets.

The variable field region, that is, the variable header field may include fields of a Flag ID, Total Length, a Protocol Type and a Label.

In case that a payload is fragmented and the same packet data unit (PDU), the Flag ID field has the same ID (value).

The Total Length field represents a packet length of original PDU, in case that the PDU is fragmented.

The Protocol Type field is generated when a packet is started, and represents a type of transmission packet. As an embodiment, the Protocol Type field may have 0x0800 value in case that a packet is based on IPv4, and have 0x86DD value in case that a packet is based on IPv6.

The Label field may be omitted depending on a Label Type field, or have 3 bytes or 6 bytes. The Label field may also be used for identifying data of payload or sorts of data.

FIG. 36 illustrates GSE packets according to another embodiment of the present invention.

As shown and described by reference to FIG. 35, since a payload is transmitted by adding the GSE header according to the GSE scheme, the capacity of header plays as an overhead, thereby decreasing transmission efficiency.

(a) In case of padding packet, as shown in FIG. 36, Start/End flag, Label Type field and Padding bit field are added in front of the padding byte, which is a payload.

(b) In case of transmitting PDU of 4096 bytes or lower as a complete packet, an overhead of 4 bytes may occur in a GSE packet, and in case of additionally using the Label field, an overhead of 3 or 6 bytes may occur additionally.

(c) In case of transmitting a payload of which size is 4096 bytes or higher as a complete packet, a PDU packet may be fragmented into a plurality of fragmentation packets, that is, the PDU packet may be transmitted by being fragmented into a start packet, an intermediate packet and an end packet. In case of the fragmentation packets, as shown in FIG. 36, a header of 7 bytes may be added to the start packet, a header of 3 bytes may be added to the intermediate packet, and a header of 7 bytes may be added to the end packet.

Accordingly, hereinafter, a method for compressing a header for preventing overhead and channel capacity degradation according to the GSE packetizing will be described.

FIG. 37 illustrates a method for compressing a GS packet according to another embodiment of the present invention.

As described above, in the GSE scheme, the GSE encapsulation is performed by adding a GSE header to a reception packet such as an IP packet, and the Protocol Type information (field) included in the header information represents a protocol type of data that are encapsulated.

However, in case that a protocol of input data is the same, for example, IPv4 or IPv6, instead of signaling the protocol type in each GSE header, by using a method of signaling once in the BB frame header or the PLS information, an overhead may be decreased.

In case that the same protocol is used for the GSE packet inputted as a data pipe (DP) unit or a BB frame unit, the GSE packet header may be compressed by using a method of transmitting the protocol type information once through an extension field of the PLS information or the BB frame header, not transmitting the protocol type information to the GS packet header when compressing header. That is, as shown in FIG. 37, a transmitter deletes the protocol type information from the GSE header, transmits the corresponding protocol type information with being inserted into the PLS information or the BB frame header information, and a receiver acquires the protocol type information from the PLS information or the BB frame header, and inserts the protocol type information into the GSE header or regenerates it, thereby recover the GSE header.

By compressing the GSE packet header using such a method, a capacity of 2 bytes per packet may be saved.

FIG. 38 illustrates a method for compressing a GS packet according to another embodiment of the present invention.

As described above, in the GSE scheme, the GSE encapsulation is performed by adding a GSE header to a reception packet such as an IP packet, and label information (field) may be included in the header information.

However, for example, in case that the label information of input data is the same, instead of signaling the label information in each GSE header, by using a method of signaling once in the BB frame header or the PLS information, an overhead may be decreased.

In case that the same label is used for the GSE packet inputted as a data pipe unit or a BB frame unit, the GSE packet header may be compressed by using a method of transmitting the label information once through an extension field of the PLS information or the BB frame header, not transmitting the label information to the GS packet header when compressing header. That is, as shown in FIG. 38, a transmitter deletes the label information from the GSE header, transmits the corresponding label information with being inserted into the PLS information or the BB frame header information, and a receiver acquires the label information and identifies the LT information (field) from the PLS information or the BB frame header, and inserts the label information into the GSE header or regenerates it, thereby recover the GSE header.

By compressing the GSE packet header using such a method, a capacity of 3 bytes or 6 bytes per packet may be saved. In other words, in case of the GSE packet to which the label information is applied, by transmitting the label information once through the PLS information or the BB frame header, fast filtering becomes available, and redundancy transmitted by 3 to 6 bytes per packet in the GSE header is decreased, thereby efficient transmission becomes available.

FIG. 39 and FIG. 40 illustrate methods for compressing a GS packet according to another embodiment of the present invention.

As described above, in the GSE scheme, in case that a size of PDU packet is over 4096 bytes, the PDU packet is fragmented and transmitted by fragmenting into a plurality of fragmentation packets. However, in order to recombine the PDU again at a receiver side, additional information such as Frag ID information (field), total length information (field), and CRC are added to the GSE header, and accordingly, additional overhead occurs. Accordingly, hereinafter, as a method for compressing a GSE header in case that a size of PDU packet is over 4096 bytes, the present invention proposes a method for merging and transmitting the GSE fragmentation packets to which the PDU over a size of 4096 byte is encapsulated.

When receiving the fragmentation packets, first, as shown in FIG. 39, a transmitter transmits the protocol type information and the label information only once through the PLS information or the BB frame header, not transmitting in the GSE header. The detailed description for this is the same as the description of FIG. 37 to FIG. 38. And, the transmitter performs a method such that the fragmented packets are recombined as shown in FIG. 40, and additional information is deleted and compressed.

As shown in FIG. 40, the transmitter recombines the fragmented payloads, and does not transmit flag or field/information which is generated or inserted for fragmentation. The information which is deleted from a header, not being transmitted, includes start flag/end flag that represent start and end of the fragmented packet, Frag ID information for distinguishing the fragmented packets, GSE length information that represents fragmented length and CRC information used for error detection when recombining packets.

In a physical layer, only the GSE length extension field (information) that has a value of total length may be inserted at a front end of the payload which is merged as shown in FIG. 40 and transmitted, and the GSE length extension field may have 2 bytes. The payload may transmit the complete data in which the fragmented PDUs are recombined using the CRC.

The receiver may acquire the label information and the protocol type information from the PLS information or the BB frame information, and parse the GSE packet. At the moment, in case that GSE packet retransmission is required, the receiver may fragment the PDU using the existing information again. That is, the receiver may fragment the PDU by generating CRC as shown in FIG. 36 and according to the GSE encapsulation method. In case of using such a method, there is an advantage of decreasing redundancy of the GSE header from maximum 59 bytes to 2 byte.

FIG. 41 illustrates a method for compressing a GS packet according to another embodiment of the present invention.

As shown in FIG. 39 and FIG. 40, the compressed GSE packet header proposed in the present invention may be configured as a length of 2 bytes, and this is as shown in FIG. 41 (*a*).

Additionally, the present invention may provide an additional function using a GSE length extension value that represents a packet of short length which is not used actually. As an example, as shown in FIG. 41 (*b*), in case that GSE length is 0, a padding byte may be inserted by using following 1 byte as padding length information. Otherwise, as shown in FIG. 41 (*c*), even in case that GSE length is 1 to 16, it is proposed to insert other additional control packets.

FIG. 42 illustrates a method for transmitting broadcast signals according to an embodiment of the present invention.

According to the broadcast signal transmitter and the operation, as described above, the broadcast signal transmitter may demultiplex an input stream that includes at least one packet into at least one data pipe (DP) using the input formatting module (step, S42010). And the broadcast signal transmitter may perform error correction processing of the data included in at least one DP using a BICM module (step, S42020). By using a frame building module, the broadcast signal transmitter may generate a signal frame that includes data of DP by mapping the data in DP to a symbol in the signal frame (step, S42030). The broadcast signal transmitter may insert a preamble into transmission signals and perform OFDM modulation using an OFDM generation module (step, S42040). Although it is not shown in FIG. 42, in addition to the steps shown in FIG. 42, the broadcast signal transmitter may generate PLS information which is used for operations of each of modules of the broadcast transmitter using a signaling/PLS generation module, and this PLS information may be transmitted with being inserted into broadcast signals.

The broadcast transmitter may perform an additional processing for an input stream using the input formatting module. That is, the broadcast transmitter may compress a header included in an input stream using a header compression module, allocate packets to a BB frame using a BB frame forming module, and insert a BB frame header including header information into the BB frame.

In relation to FIG. 26 to FIG. 41, as described above, the broadcast transmitter may compress the packets included in GS, and insert the header compression information related to this into the PLS information or the BB frame header. The header compression information may include at least one of the start byte and the type information in case of the packet header compression of TLV scheme. The header compression information may include at least one of the label information and the protocol type information in case of the packet header compression of GSE scheme. The method of compressing a packet header and signaling for each scheme is as described above.

FIG. 43 illustrates a method for transmitting broadcast signals according to an embodiment of the present invention.

According to the broadcast signal transmitter and the operation, as described above, the broadcast signal transmitter may perform signal detection and OFDM demodulation for the received broadcast signals using synchronization/demodulation module (step, S43010). The broadcast signal receiver may extract service data by parsing a signal frame of the received broadcast signals using the frame parsing module (step, S43020). The broadcast signal receiver may transform the service data extracted from the received broadcast signals into a bit domain and deinterleave the service data using the demapping and decoding module (step, S43030). And the broadcast signal receiver may output the processed service data into a data stream using the output processing module (step, S43040). In addition, although it is not shown in FIG. 43, in addition to the steps shown in FIG. 43, the broadcast signal receiver may acquire and process the information required for parsing the PLS information using the signaling decoding module and processing the received signals in each of the modules.

The broadcast signal receiver may perform additional processing for the output stream using the output processing module. That is, the broadcast signal receiver may parse a BB frame header of the received broadcast signals using the BB frame header parser module. And the broadcast signal receiver may de-compress the headers of the packets included in a BB frame through the header de-compression module. And the broadcast signal receiver may output an output stream by combining packets using the packet recombining module.

In relation to FIG. 26 to FIG. 41, as described above, the header of the packets included in GS may be compressed, and the header compression information related to this may be included in the BB frame header or the PLS information. The header compression information may include at least one of the start byte and the type information in case of the packet header compression of TLV scheme. The header compression information may include at least one of the label information and the protocol type information in case of the packet header compression of GSE scheme. A receiver may acquire the header compression information by parsing the BB frame header or the PLS information, and by using this, may recover the compressed header information of packets. The method of recovering a packet header and acquiring the header compression information for each scheme is as described above.

It will be understood to those skilled in the art that various modifications and variations can be made in the present invention described so far, without departing from the spirit or scope of the inventions. Therefore, the present invention is intended to include modifications and variations of the present invention provided by the attached claims and the equivalence.

In the present specification, both of the device invention and the method invention are mentioned, and the description of the device invention and the method invention may be applied to each other in complementary manner.

MODE FOR INVENTION

Various embodiments are described in the best mode for invention.

INDUSTRIAL APPLICABILITY

The present invention is utilized in a series of broadcast signal provision field.

It will be understood to those skilled in the art that various modifications and variations can be made in the present invention described so far, without departing from the spirit or scope of the inventions. Therefore, the present invention is intended to include modifications and variations of the present invention provided by the attached claims and the equivalence.

The invention claimed is:

1. An apparatus for transmitting a broadcast signal, the apparatus comprising:
    an input formatting unit to de-multiplex an input stream into at least one Data Pipe (DP);
    a Bit Interleaved Coding and Modulation (BICM) unit to perform error correction processing on data of the at least one DP;
    a frame building unit to generate a signal frame including the data of the DP; and
    an Orthogonal Frequency Division Multiplexing (OFDM) generator to generate a transmission broadcast signal by performing OFDM modulation,
    wherein the input formatting module unit further comprises a header compression unit to compress headers of packets included in the input stream, a Baseband (BB) frame forming unit configured to allocate data of the packets to a BB frame, and a BB frame header insertion unit to insert a BB frame header into the BB frame,
    wherein the packet is a Generic Stream Encapsulation (GSE) packet, the GSE packet including a GSE packet header, and the GSE packet header includes at least one of a start flag, an end flag, GSE length information, protocol type information and label information, and
    wherein the input formatting unit deletes the protocol type information in case that the protocol type of the GSE packets included in the DP or BB frame is identical, and the protocol type information is transmitted as being included in Physical Layer Signaling (PLS) information or the BB frame header.

2. The apparatus for transmitting a broadcast signal of claim 1, wherein the input formatting unit deletes the label information in case that the label information of the GSE packets included in the DP or BB frame is identical, and
    wherein the label information is transmitted as being included in the PLS information or the BB frame header.

3. The apparatus for transmitting a broadcast signal of claim 1, wherein the input formatting unit recombines fragmentation packets in case that the GSE packets are the fragmentation packets.

4. A method for transmitting a broadcast signal, the method comprising:
    input-formatting an input stream into at least one Data Pipe (DP);
    performing error correction processing on data of the at least one DP;
    generating a signal frame including the data of the DP; and
    generating a transmission broadcast signal by performing Orthogonal Frequency Division Multiplexing (OFDM) modulation,
        wherein the input formatting further comprises compressing headers of packets included in the input stream, allocating data of the packets to a baseband (BB) frame, and inserting a BB frame header into the BB frame,
    wherein the packet is a Generic Stream Encapsulation (GSE) packet, the GSE packet including a GSE packet header, and the GSE packet header includes at least one of a start flag, an end flag, GSE length information, protocol type information and label information, and
    wherein the input formatting further comprises deleting the protocol type information in case that the protocol type of the GSE packets included in the DP or BB frame is identical, and the protocol type information is transmitted as being included in Physical Layer Signaling (PLS) information or the BB frame header.

5. The method for transmitting a broadcast signal of claim 4, wherein the input formatting further comprises deleting the label information in case that the label information of the GSE packets included in the DP or BB frame is identical, and
    wherein the label information is transmitted as being included in the PLS information or the BB frame header.

6. The method for transmitting a broadcast signal of claim 4, wherein the input formatting further comprises recombining fragmentation packets in case that the GSE packets are the fragmentation packets.

7. An apparatus for receiving a broadcast signal, the apparatus comprising:
    a synchronization/demodulation unit to perform signal detection and Orthogonal Frequency Division Multiplexing (OFDM) demodulation for a received broadcast signal;
    a frame parser to extract service data by parsing a signal frame of the received broadcast signal;
    a demapping/decoding unit to transform the service data to a bit domain and perform deinterleaving; and
    an output processor to output-process the service data and to output a data stream,
    wherein the output processor module further comprises a baseband (BB) frame header parser to parse a BB frame header, a header de-compression unit to de-compress headers of at least one packet included in the BB frame, and a packet recombining unit to output the data stream by combining the packets,
    wherein the packet is a Generic Stream Encapsulation (GSE) packet, the GSE packet including a GSE packet header, and the GSE packet header includes at least one of a start flag, an end flag, GSE length information, protocol type information and label information, and
    wherein the output processor recovers the protocol type information in case that the protocol type of the GSE packets included in a data pipe (DP) or BB frame is identical, and the protocol type information is acquired from the Physical Layer Signaling (PLS) information or the BB frame header.

8. The apparatus for receiving a broadcast signal of claim 7, wherein the output processor recovers the label information in case that the label information of the GSE packets included in the DP or BB frame is identical, and
    wherein the label information is acquired from the PLS information or the BB frame header.

9. A method for receiving a broadcast signal, the method comprising:
    performing signal detection and Orthogonal Frequency Division Multiplexing (OFDM) demodulation for a received broadcast signal;

extracting service data by parsing a signal frame of the received broadcast signal;

transforming the service data to a bit domain and performing deinterleaving; and output processing the service data and to output a data stream, wherein the output processing further comprises parsing a baseband (BB) frame header, de-compressing headers of at least one packet included in the BB frame, and outputting the data stream by combining the packets, wherein the packet is a Generic Stream Encapsulation (GSE) packet, the GSE packet including a GSE packet header, and the GSE packet header includes at least one of a start flag, an end flag, GSE length information, protocol type information and label information, and wherein the output processing further comprises recovering the protocol type information in case that the protocol type of the GSE packets included in a data pipe (DP) or BB frame is identical, and the protocol type information is acquired from the Physical Layer Signaling (PLS) information or the BB frame header.

10. The method for receiving a broadcast signal of claim 9, wherein the output processing further comprises recovering the label information in case that the label information of the GSE packets included in the DP or BB frame is identical, and wherein the label information is acquired from the PLS information or the BB frame header.

* * * * *